United States Patent
Li et al.

(10) Patent No.: US 11,088,804 B2
(45) Date of Patent: Aug. 10, 2021

(54) REFERENCE SIGNAL TRANSMISSION METHOD, APPARATUS, AND SYSTEM

(71) Applicant: HUAWEI TECHNOLOGIES CO., LTD., Guangdong (CN)

(72) Inventors: Chaojun Li, Beijing (CN); Jian Zhang, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/046,678

(22) Filed: Jul. 26, 2018

(65) Prior Publication Data
US 2018/0375631 A1 Dec. 27, 2018

Related U.S. Application Data

(63) Continuation of application No. PCT/CN2016/072798, filed on Jan. 29, 2016.

(51) Int. Cl.
*H04L 5/00* (2006.01)
*H04W 28/16* (2009.01)
*H04W 72/04* (2009.01)

(52) U.S. Cl.
CPC .......... *H04L 5/0053* (2013.01); *H04L 5/0048* (2013.01); *H04L 5/0094* (2013.01); *H04W 28/16* (2013.01); *H04W 72/042* (2013.01); *H04W 72/0446* (2013.01); *H04L 5/0082* (2013.01)

(58) Field of Classification Search
CPC ... H04L 5/0048; H04L 5/0053; H04L 5/0094; H04L 5/0082; H04W 72/042; H04W 72/0446; H04W 28/16

USPC ......................................................... 370/329
See application file for complete search history.

(56) References Cited

U.S. PATENT DOCUMENTS

| | | | |
|---|---|---|---|
| 9,485,052 B2 * | 11/2016 | Chung | ................ H04L 27/2602 |
| 2008/0043708 A1 | 2/2008 | Muharemovic et al. | |
| 2012/0014343 A1 | 1/2012 | Womack et al. | |
| 2013/0188577 A1 | 7/2013 | Papasakellariou et al. | |

(Continued)

FOREIGN PATENT DOCUMENTS

| | | |
|---|---|---|
| CN | 101795145 A | 8/2010 |
| CN | 102027791 A | 4/2011 |

(Continued)

OTHER PUBLICATIONS

Office Action issued in Chinese Application No. 201811288193.X dated May 21, 2019, 13 pages.

(Continued)

*Primary Examiner* — Rownak Islam
(74) *Attorney, Agent, or Firm* — Fish & Richardson P.C.

(57) ABSTRACT

The present disclosure relates to a reference signal transmission method. In one example method, physical layer signaling is received by a terminal device. The physical layer signaling includes configuration information. The configuration information indicates a time domain resource of a reference signal. The time domain resource of the reference signal is determined by the terminal device according to the configuration information. The reference signal and a first physical channel is sent by the terminal device. The reference signal is used for demodulation of the first physical channel.

11 Claims, 10 Drawing Sheets

(56) References Cited

U.S. PATENT DOCUMENTS

| | | | |
|---|---|---|---|
| 2013/0343239 A1 | 12/2013 | Damnjanovic et al. | |
| 2013/0343358 A1* | 12/2013 | Kato | H04L 5/0091 370/336 |
| 2014/0241284 A1 | 8/2014 | Zhou | |
| 2014/0313955 A1 | 10/2014 | Womack et al. | |
| 2014/0348123 A1 | 11/2014 | Zhou et al. | |
| 2015/0222402 A1 | 8/2015 | Ouchi et al. | |
| 2015/0230211 A1* | 8/2015 | You | H04L 5/0051 370/330 |
| 2016/0095104 A1* | 3/2016 | Chen | H04L 5/0048 370/329 |
| 2018/0220465 A1* | 8/2018 | Zhang | H04L 5/0053 |
| 2018/0375631 A1 | 12/2018 | Li et al. | |
| 2019/0007248 A1* | 1/2019 | Takeda | H04W 72/12 |
| 2019/0007934 A1 | 1/2019 | Wang et al. | |

FOREIGN PATENT DOCUMENTS

| | | | | |
|---|---|---|---|---|
| CN | 103220102 A | 7/2013 | | |
| CN | 103326964 A | 9/2013 | | |
| CN | 103391179 A | 11/2013 | | |
| CN | 103428775 A | 12/2013 | | |
| CN | 103944665 A | 7/2014 | | |
| CN | 104010363 A | 8/2014 | | |
| CN | 104396178 A | 3/2015 | | |
| CN | 104685948 A | 6/2015 | | |
| CN | 105191464 A | 12/2015 | | |
| CN | 108605247 A | 9/2018 | | |
| CN | 109286481 | 11/2019 | | |
| JP | 2016519485 A | 6/2016 | | |
| JP | 2018538716 A | 12/2018 | | |
| RU | 2584825 C1 * | 5/2016 | ............ | H04W 72/04 |
| WO | 2014161142 A1 | 10/2014 | | |
| WO | 2016008152 A1 | 1/2016 | | |
| WO | 2017078595 A1 | 5/2017 | | |

OTHER PUBLICATIONS

Office Action issued in Japanese Application No. 2018-539086 dated Apr. 23, 2019, 12 pages (with English translation).
R1-157151—ZTE, "L1 considerations on latency reduction," 3GPP TSG-RAN WG1 #83, Anaheim, USA, Nov. 15-22, 2015, 7 pages.
R2-154740—Ericsson, "Study of shorter TTI for latency reduction," 3GPP TSG-RAN WG2 #91bis, Malmö, Sweden, Oct. 5-9, 2015, 9 pages.
3GPP TS 36.211 V13.0.0 (Dec. 2015),3rd Generation Partnership Project;Technical Specification Group Radio Access Network;Evolved Universal Terrestrial Radio Access (E-UTRA);Physical channels and modulation(Release 13),total 141 pages.
TS 36.212 V15.0.1 3GPP TS 36.212 V13.0.0 (Dec. 2015),3rd Generation Partnership Project;Technical Specification Group Radio Access Network; Evolved Universal Terrestrial Radio Access (E-UTRA);Multiplexing and channel coding (Release 13),total 121 pages.
R1-157149 Ericsson,"Physical layer aspects of short TTI for uplink transmissions",3GPP TSG RAN WG1 Meeting #83,Anaheim, USA, Nov. 15-22, 2015,total 4 pages.
International Search Report issued in International Application No. PCT/CN2016/072798 dated Oct. 13, 2016, 19 pages.
Extended European Search Report issued in European Application No. 16887180.4 dated Nov. 27, 2018, 8 pages.
Office Action issued in Chinese Application No. 201811287056.4 dated Jun. 20, 2019, 25 pages (With English Translation).
Office Action issued in Chinese Application No. 201811287056.4 dated Nov. 4, 2019, 6 pages (With English Translation).
Catt, "System Analysis on TTI Shortening," 3GPP TSG RAN WG1 #83, R1-156613; Anaheim, CA, USA, Nov. 15-22, 2015, 8 pages.
Office Action issued in Korean Application No. 2018-7024176 dated Feb. 13, 2020, 11 pages (with English translation).
Office Action issued in Japanese Application No. 2018-539086 dated Jun. 23, 2020, 5 pages (with English translation).

* cited by examiner

Configuration 2

Configuration 3

Configuration 4

Configuration 2

Configuration 1

Configuration 2

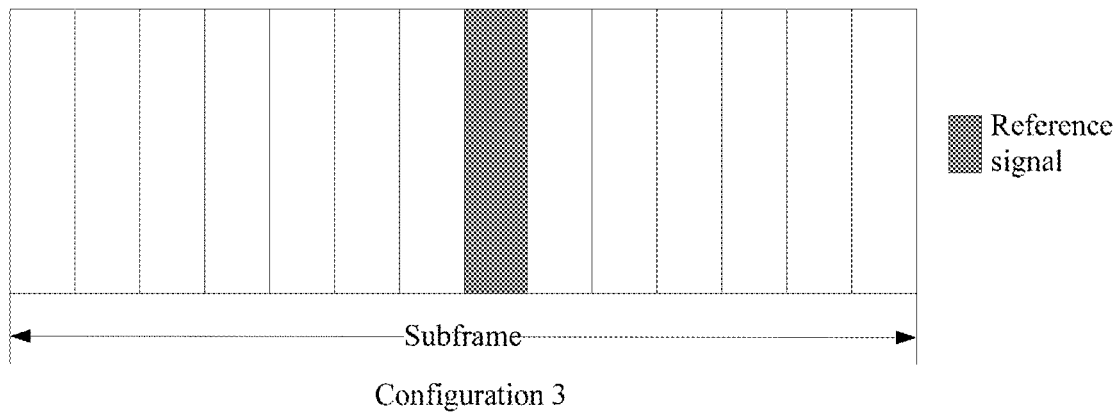
FIG. 9 (c) Configuration 3
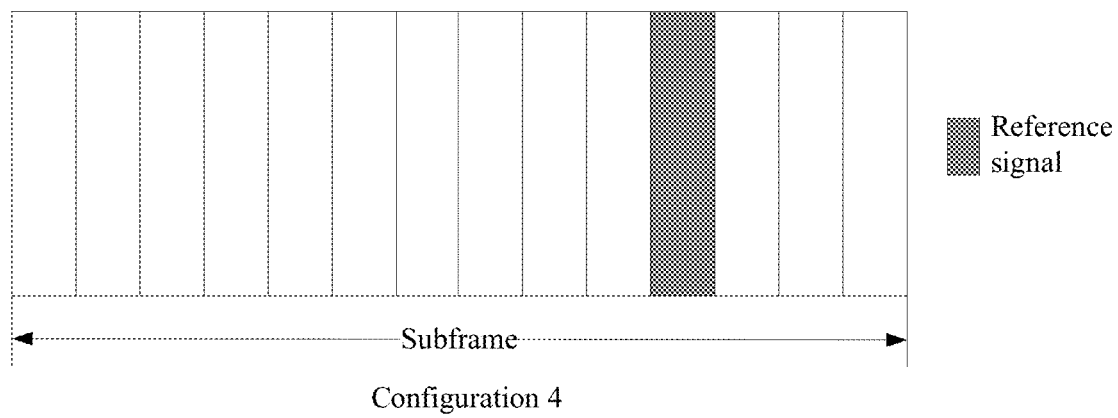
FIG. 9 (d) Configuration 4
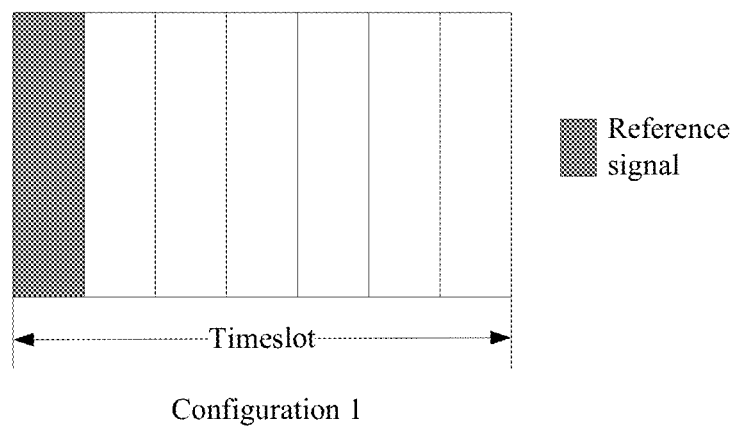
FIG. 10 (a) Configuration 1

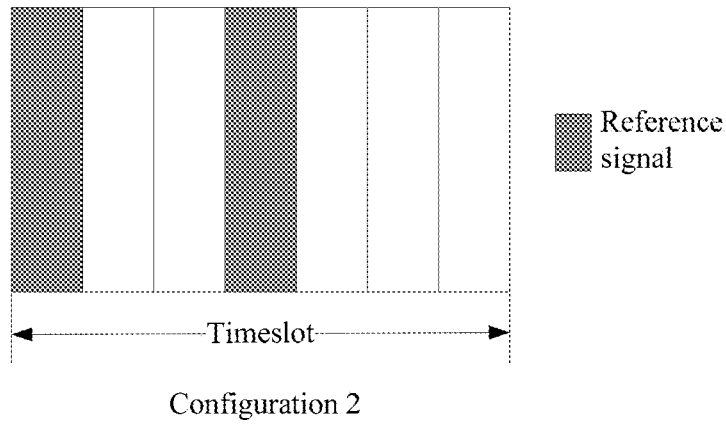

Configuration 2

FIG. 10 (b)

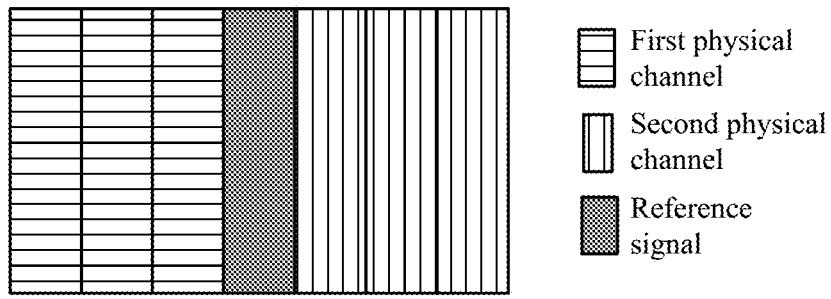

FIG. 11

| A network device sends first physical layer signaling to a first terminal device, where the first physical layer signaling includes first configuration information, and the first configuration information is used to indicate a time domain resource of a first reference signal | ⟵ 1201 |

| The network device receives a first physical channel sent by the first terminal device, and demodulates the first physical channel according to the first reference signal; or the network device sends a first physical channel to the first terminal device, where the first reference signal is used for demodulation of the first physical channel | ⟵ 1202 |

FIG. 12

REFERENCE SIGNAL TRANSMISSION METHOD, APPARATUS, AND SYSTEM

CROSS-REFERENCE TO RELATED APPLICATIONS

This application is a continuation of International Application No. PCT/CN2016/072798, filed on Jan. 29, 2016, the disclosure of which is hereby incorporated by reference in its entirety.

TECHNICAL FIELD

The present disclosure relates to the field of wireless communications technologies, and in particular, to a reference signal transmission method, apparatus, and system.

BACKGROUND

For uplink transmission, a terminal device sends an uplink physical channel and an uplink reference signal to a network device; and after receiving the uplink physical channel and the uplink reference signal, the network device performs channel estimation according to the uplink reference signal, and then demodulates the uplink physical channel according to an estimated channel value. On the contrary, for downlink transmission, the terminal device receives a downlink physical channel and a downlink reference signal that are sent by the network device, performs channel estimation according to the downlink reference signal, and then demodulates the downlink physical channel according to an estimated channel value.

In an existing system, an uplink/downlink reference signal and an uplink/downlink physical channel are located in a same transmission time interval (TTI), and the uplink/downlink reference signal occupies a fixed time domain resource in the TTI. For example, a reference signal used for physical uplink shared channel (PUSCH) demodulation is always located on a fourth symbol in a timeslot.

At least the following problem is found: Based on the foregoing processing manner, each physical channel has a corresponding reference signal, and the corresponding reference signal occupies a fixed time domain resource in a TTI in which the physical channel is located. Therefore, reference signal configuration has poor flexibility.

SUMMARY

To implement relatively flexible reference signal configuration, embodiments of the present invention provide a reference signal transmission method, apparatus, and system. The technical solutions are as follows:

According to a first aspect, a reference signal transmission method is provided, where the method includes:

receiving, by a terminal device, physical layer signaling sent by a network device, where the physical layer signaling includes configuration information, and the configuration information is used to indicate a time domain resource of a reference signal;

determining, by the terminal device, the time domain resource of the reference signal according to the configuration information; and sending, by the terminal device, the reference signal and a first physical channel to the network device, where the reference signal is used for demodulation of the first physical channel.

After the network device sends the physical layer signaling to the terminal device, the terminal device may receive the physical layer signaling sent by the network device, where the physical layer signaling includes the configuration information, and the configuration information is used to indicate a time domain resource of a reference signal corresponding to a physical channel scheduled by the physical layer signaling. After receiving the physical layer signaling sent by the network device, the terminal device may determine the time domain resource of the reference signal according to the configuration information included in the physical layer signaling. Specifically, N predefined reference signal time domain configurations of the reference signal may be prestored in the terminal device; and after receiving the physical layer signaling sent by the network device, the terminal device may determine the time domain resource of the reference signal according to a configuration manner indicated by the configuration information included in the physical layer signaling. Then, the terminal device may send the reference signal and the first physical channel to the network device, where the reference signal is used for demodulation of the first physical channel.

With reference to the first aspect, in a first possible implementation of the first aspect, the configuration information is used to indicate one of N reference signal time domain configurations, where N is a positive integer, and any two of the N reference signal time domain configurations indicate different time domain resources occupied by the reference signal.

With reference to the first aspect, in a second possible implementation of the first aspect, the configuration information indicates that the reference signal and the first physical channel are located in a same transmission time interval TTI, or that the reference signal is located in a $k^{th}$ TTI before a TTI in which the first physical channel is located, where k is a positive integer.

The terminal device determines, according to the configuration information, that the reference signal and the first physical channel are located in the same TTI, or that the reference signal is located in the $k^{th}$ TTI before the TTI in which the first physical channel is located, where k is a positive integer. For example, k is 1, 2, or 3. In other words, the terminal device determines, according to the configuration information for the time domain resource of the reference signal, that the reference signal is located in a $k^{th}$ TTI before the TTI in which the first physical channel is located, where k is a nonnegative integer. For example, k is 0, 1, 2, or 3. Optionally, when the configuration information indicates that k is 0, the terminal device determines that the first physical channel occupies some symbols in the TTI in which the first physical channel is located (the reference signal does not occupy the some symbols); or when the configuration information indicates that k is greater than 0, the terminal device determines that the first physical channel occupies all symbols in the TTI in which the first physical channel is located.

With reference to the first aspect, in a third possible implementation of the first aspect, the reference signal and the first physical channel are located in a same TTI, and the configuration information is used to indicate that the reference signal is located on a first symbol or a last symbol in the TTI.

The terminal device determines, according to the configuration information, that the reference signal and the first physical channel are located in the same TTI, and that the reference signal is located on the first symbol or the last symbol in the TTI. That is, the reference signal is located on a symbol before the first physical channel, or the reference signal is located on a symbol after the first physical channel. Optionally, the terminal device determines, according to the configuration information, that the first physical channel does not occupy the first symbol or the last symbol in the TTI.

With reference to the first aspect, in a fourth possible implementation of the first aspect, the reference signal and the first physical channel are located in a same timeslot or subframe, and the configuration information is used to indicate that the reference signal is located on an $a^{th}$ symbol in the timeslot or a $b^{th}$ symbol in the subframe, where a is 1 or 4, and b is 1, 4, 8, or 11.

The terminal device determines, according to the configuration information, that the reference signal is located on an $a^{th}$ symbol in a timeslot or a $b^{th}$ symbol in a subframe, where the timeslot or subframe is a timeslot or subframe in which the first physical channel is located. For example, the configuration information may be used to indicate that the reference signal is located on a first symbol or a fourth symbol in the timeslot in which the first physical channel is located. For example, the configuration information may be used to indicate that the reference signal is located on a first symbol, a fourth symbol, an eighth symbol, or an eleventh symbol in the subframe in which the first physical channel is located. Optionally, the terminal device determines, according to the configuration information, that the first physical channel does not occupy the $a^{th}$ symbol in the timeslot or the $b^{th}$ symbol in the subframe.

With reference to the first aspect, in a fifth possible implementation of the first aspect, the reference signal and the first physical channel are located in a same timeslot, and the configuration information is used to indicate that the reference signal is located on a first symbol in the timeslot or a first symbol and a fourth symbol in the timeslot.

The terminal device determines, according to the configuration information, that the reference signal is located on c symbols in a timeslot or d symbols in a subframe, where the timeslot or subframe is a timeslot or subframe in which the first physical channel is located. Optionally, the terminal device determines, according to the configuration information, that the first physical channel does not occupy the c symbols in the timeslot or the d symbols in the subframe.

With reference to the first aspect or the first to the fifth possible implementations of the first aspect, in a sixth possible implementation of the first aspect, the method further includes:

sending, by the terminal device, a second physical channel to the network device, where the reference signal is used for demodulation of the second physical channel, and the first physical channel and the second physical channel are located in different TTIs.

The terminal device may further send the second physical channel to the network device, where the first physical channel and the second physical channel are located in different TTIs, and correspond to the same reference signal, that is, the reference signal may be used for demodulation of the first physical channel, and may also be used for demodulation of the second physical channel.

In this way, a same reference signal may be configured for different physical channels of a same terminal device, so as to reduce reference signal overheads.

With reference to the first aspect or the first to the sixth possible implementations of the first aspect, in a seventh possible implementation of the first aspect, the configuration information is further used to indicate that the reference signal is located on a subcarrier whose number is even or a subcarrier whose number is odd; and the determining, by the terminal device, the time domain resource of the reference signal according to the configuration information includes:

determining, by the terminal device, the time domain resource of the reference signal according to the configuration information, and determining, according to the configuration information, that the reference signal is located on the subcarrier whose number is even or the subcarrier whose number is odd.

The configuration information is further used to indicate a frequency domain resource of the reference signal. Specifically, the configuration information may be used to indicate that the reference signal is located on the subcarrier whose number is even or the subcarrier whose number is odd. In this case, the terminal device may be configured to: determine the time domain resource of the reference signal according to the configuration information, and determine, according to the configuration information, that the reference signal is located on the subcarrier whose number is even or the subcarrier whose number is odd.

In this way, reference signals on a same symbol can be separated by using frequency domain resources. Further, reference signals corresponding to different terminal devices can be configured on a same symbol, so as to reduce reference signal overheads.

With reference to the first aspect or the first to the seventh possible implementations of the first aspect, in an eighth possible implementation of the first aspect, the physical layer signaling is downlink control information DCI, and the DCI is multicast signaling, or the DCI is unicast signaling.

According to a second aspect, a reference signal transmission method is provided, where the method includes:

sending, by a network device, first physical layer signaling to a first terminal device, where the first physical layer signaling includes first configuration information, and the first configuration information is used to indicate a time domain resource of a first reference signal;

receiving, by the network device, the first reference signal and a first physical channel that are sent by the first terminal device; and demodulating, by the network device, the first physical channel according to the first reference signal.

The physical layer signaling may be DCI.

The network device may determine the time domain resource of the first reference signal, and send the first physical layer signaling to the first terminal device (which may be any terminal device), where the first physical layer signaling includes the first configuration information, and the first configuration information is used to indicate the time domain resource of the first reference signal, that is, the first physical layer signaling includes information used to indicate the time domain resource of the first reference signal. After receiving the physical layer signaling sent by the network device, the first terminal device may determine the time domain resource of the first reference signal, and may send the first reference signal and the first physical channel to the network device; and after the first terminal device sends the first reference signal and the first physical channel to the network device, the network device may receive the first reference signal and the first physical channel that are sent by the first terminal device. Then, the network device may demodulate the first physical channel according to the first reference signal.

With reference to the second aspect, in a first possible implementation of the second aspect, the first configuration information is used to indicate one of N reference signal time domain configurations, where N is a positive integer, and any two of the N reference signal time domain configurations indicate different time domain resources occupied by the reference signal.

With reference to the second aspect, in a second possible implementation of the second aspect, the first configuration information indicates that the first reference signal and the first physical channel are located in a same transmission time interval TTI, or that the first reference signal is located in a $k^{th}$ TTI before a TTI in which the first physical channel is located, where k is a positive integer.

The first configuration information indicates that the first reference signal and the first physical channel are located in the same transmission time interval TTI, or that the first reference signal is located in the $k^{th}$ TTI before the TTI in which the first physical channel is located, where k is a positive integer. For example, k is 1, 2, or 3. In other words, the first configuration information indicates that the first reference signal is located in a $k^{th}$ TTI before the TTI in which the first physical channel is located, where k is a nonnegative integer. For example, k is 0, 1, 2, or 3. Optionally, when the first configuration information indicates that k is 0, the first physical channel occupies some symbols in the TTI in which the first physical channel is located (the first reference signal does not occupy the some symbols); or when the first configuration information indicates that k is greater than 0, the first physical channel occupies all symbols in the TTI in which the first physical channel is located.

With reference to the second aspect, in a third possible implementation of the second aspect, the first reference signal and the first physical channel are located in a same TTI, and the first configuration information is used to indicate that the first reference signal is located on a first symbol or a last symbol in the TTI.

The first information reference signal and the first physical channel are located in the same TTI, and the first reference signal is located on the first symbol or the last symbol in the TTI. That is, the first reference signal is located on a symbol before the first physical channel, or the first reference signal is located on a symbol after the first physical channel. Optionally, the first configuration information may be used to indicate that the first physical channel does not occupy the first symbol or the last symbol in the TTI.

With reference to the second aspect, in a fourth possible implementation of the second aspect, the first reference signal and the first physical channel are located in a same timeslot or subframe, and the first configuration information is used to indicate that the first reference signal is located on an $a^{th}$ symbol in the timeslot or a $b^{th}$ symbol in the subframe, where a is 1 or 4, and b is 1, 4, 8, or 11.

The first configuration information is used to indicate that the first reference signal is located on an $a^{th}$ symbol in a timeslot or a $b^{th}$ symbol in a subframe, where the timeslot or subframe is a timeslot or subframe in which the first physical channel is located. For example, the first configuration information may be used to indicate that the first reference signal is located on a first symbol or a fourth symbol in the timeslot in which the first physical channel is located. For example, the first configuration information may be used to indicate that the first reference signal is located on a first symbol, a fourth symbol, an eighth symbol, or an eleventh symbol in the subframe in which the first physical channel is located. Optionally, the first configuration information may be used to indicate that the first physical channel does not occupy the $a^{th}$ symbol in the timeslot or the $b^{th}$ symbol in the subframe.

With reference to the second aspect, in a fifth possible implementation of the second aspect, the first reference signal and the first physical channel are located in a same timeslot, and the first configuration information is used to indicate that the first reference signal is located on a first symbol in the timeslot or a first symbol and a fourth symbol in the timeslot.

With reference to the second aspect or the first to the fifth possible implementations of the second aspect, in a sixth possible implementation of the second aspect, the method further includes:

receiving, by the network device, a second physical channel sent by the first terminal device, where the first physical channel and the second physical channel are located in different TTIs; and demodulating, by the network device, the second physical channel according to the first reference signal.

For a case in which the first terminal device sends the second physical channel, the network device may further receive the second physical channel sent by the first terminal device, where the first physical channel and the second physical channel are located in different TTIs. Then, the network device may demodulate the second physical channel according to the first reference signal.

In this way, a same reference signal may be configured for different physical channels of a same terminal device, so as to reduce reference signal overheads.

With reference to the second aspect or the first to the sixth possible implementations of the second aspect, in a seventh possible implementation of the second aspect, the first configuration information is further used to indicate that the first reference signal is located on a subcarrier whose number is even or a subcarrier whose number is odd.

In this way, reference signals located on a same time domain resource can be effectively separated by using frequency domain resources.

With reference to the second aspect or the first to the seventh possible implementations of the second aspect, in an eighth possible implementation of the second aspect, the method further includes:

sending, by the network device, second physical layer signaling to a second terminal device, where the second physical layer signaling includes second configuration information, and the second configuration information is used to indicate a time domain resource of a second reference signal;

receiving, by the network device, the second reference signal and a third physical channel that are sent by the second terminal device, where the second reference signal and the first reference signal are located on a same time domain resource, and the first physical channel and the third physical channel are located in different TTIs; and demodulating, by the network device, the third physical channel according to the second reference signal.

The network device may send the second physical layer signaling to the second terminal device, where the second physical layer signaling may include the second configuration information, and the second configuration information may be used to indicate the time domain resource of the second reference signal. The second terminal device may determine the time domain resource of the second reference signal, and send the second reference signal and the third physical channel to the network device. The third physical channel may be a physical channel scheduled by the second physical layer signaling, and is a physical channel corresponding to the second reference signal. The network device may receive the second reference signal and the third physical channel that are sent by the second terminal device, where the second reference signal and the first reference signal may be located on the same time domain resource, and located on different frequency domain resources or code domain resources, and the first physical channel and the third physical channel are located in different TTIs. Then, the network device may demodulate the third physical channel according to the second reference signal.

In this way, reference signals respectively corresponding to physical channels of different terminal devices may be configured on a same time domain resource, so as to reduce reference signal overheads.

With reference to the second aspect or the first to the eighth possible implementations of the second aspect, in a ninth possible implementation of the second aspect, the first physical layer signaling is first DCI, the second physical layer signaling is second DCI, and the first DCI or the second DCI or both are unicast signaling, or the first DCI and the second DCI are same DCI and are multicast signaling.

According to a third aspect, a terminal device is provided, where the terminal device includes a receiver, a processor, and a transmitter, where the receiver is configured to receive physical layer signaling sent by a network device, where the physical layer signaling includes configuration information, and the configuration information is used to indicate a time domain resource of a reference signal;

the processor is configured to determine the time domain resource of the reference signal according to the configuration information received by the receiver; and the transmitter is configured to send the reference signal determined by the processor and a first physical channel to the network device, where the reference signal is used for demodulation of the first physical channel.

With reference to the third aspect, in a first possible implementation of the third aspect, the configuration information is used to indicate one of N reference signal time domain configurations, where N is a positive integer, and any two of the N reference signal time domain configurations indicate different time domain resources occupied by the reference signal.

With reference to the third aspect, in a second possible implementation of the third aspect, the configuration information indicates that the reference signal and the first physical channel are located in a same transmission time interval TTI, or that the reference signal is located in a $k^{th}$ TTI before a TTI in which the first physical channel is located, where k is a positive integer.

With reference to the third aspect, in a third possible implementation of the third aspect, the reference signal and the first physical channel are located in a same TTI, and the configuration information is used to indicate that the reference signal is located on a first symbol or a last symbol in the TTI.

With reference to the third aspect, in a fourth possible implementation of the third aspect, the reference signal and the first physical channel are located in a same timeslot or subframe, and the configuration information is used to indicate that the reference signal is located on an $a^{th}$ symbol in the timeslot or a $b^{th}$ symbol in the subframe, where a is 1 or 4, and b is 1, 4, 8, or 11.

With reference to the third aspect, in a fifth possible implementation of the third aspect, the reference signal and the first physical channel are located in a same timeslot, and the configuration information is used to indicate that the reference signal is located on a first symbol in the timeslot or a first symbol and a fourth symbol in the timeslot.

With reference to the third aspect or the first to the fifth possible implementations of the third aspect, in a sixth possible implementation of the third aspect, the transmitter is further configured to:

send a second physical channel to the network device, where the reference signal is used for demodulation of the second physical channel, and the first physical channel and the second physical channel are located in different TTIs.

With reference to the third aspect or the first to the sixth possible implementations of the third aspect, in a seventh possible implementation of the third aspect, the configuration information is further used to indicate that the reference signal is located on a subcarrier whose number is even or a subcarrier whose number is odd; and the processor is specifically configured to:

determine the time domain resource of the reference signal according to the configuration information, and determine, according to the configuration information, that the reference signal is located on the subcarrier whose number is even or the subcarrier whose number is odd.

With reference to the third aspect or the first to the seventh possible implementations of the third aspect, in an eighth possible implementation of the third aspect, the physical layer signaling is downlink control information DCI, and the DCI is multicast signaling, or the DCI is unicast signaling.

According to a fourth aspect, a network device is provided, where the network device includes a transmitter, a receiver, and a processor, where the transmitter is configured to send first physical layer signaling to a first terminal device, where the first physical layer signaling includes first configuration information, and the first configuration information is used to indicate a time domain resource of a first reference signal;

the receiver is configured to receive the first reference signal and a first physical channel that are sent by the first terminal device; and the processor is configured to demodulate the first physical channel according to the first reference signal received by the receiver.

With reference to the fourth aspect, in a first possible implementation of the fourth aspect, the first configuration information is used to indicate one of N reference signal time domain configurations, where N is a positive integer, and any two of the N reference signal time domain configurations indicate different time domain resources occupied by the reference signal.

With reference to the fourth aspect, in a second possible implementation of the fourth aspect, the first configuration information indicates that the first reference signal and the first physical channel are located in a same transmission time interval TTI, or that the first reference signal is located in a $k^{th}$ TTI before a TTI in which the first physical channel is located, where k is a positive integer.

With reference to the fourth aspect, in a third possible implementation of the fourth aspect, the first reference signal and the first physical channel are located in a same TTI, and the first configuration information is used to indicate that the first reference signal is located on a first symbol or a last symbol in the TTI.

With reference to the fourth aspect, in a fourth possible implementation of the fourth aspect, the first reference signal and the first physical channel are located in a same timeslot or subframe, and the first configuration information is used to indicate that the first reference signal is located on an $a^{th}$ symbol in the timeslot or a $b^{th}$ symbol in the subframe, where a is 1 or 4, and b is 1, 4, 8, or 11.

With reference to the fourth aspect, in a fifth possible implementation of the fourth aspect, the first reference signal and the first physical channel are located in a same timeslot, and the first configuration information is used to indicate that the first reference signal is located on a first symbol in the timeslot or a first symbol and a fourth symbol in the timeslot.

With reference to the fourth aspect or the first to the fifth possible implementations of the fourth aspect, in a sixth possible implementation of the fourth aspect, the receiver is further configured to:

receive a second physical channel sent by the first terminal device, where the first physical channel and the second physical channel are located in different TTIs; and the processor is further configured to:

demodulate the second physical channel according to the first reference signal.

With reference to the fourth aspect or the first to the sixth possible implementations of the fourth aspect, in a seventh possible implementation of the fourth aspect, the first configuration information is further used to indicate that the first reference signal is located on a subcarrier whose number is even or a subcarrier whose number is odd.

With reference to the fourth aspect or the first to the seventh possible implementations of the fourth aspect, in an eighth possible implementation of the fourth aspect, the transmitter is further configured to:

send second physical layer signaling to a second terminal device, where the second physical layer signaling includes second configuration information, and the second configuration information is used to indicate a time domain resource of a second reference signal;

the receiver is further configured to:

receive the second reference signal and a third physical channel that are sent by the second terminal device, where the second reference signal and the first reference signal are located on a same time domain resource, and the first physical channel and the third physical channel are located in different TTIs; and the processor is further configured to:

demodulate the third physical channel according to the second reference signal.

With reference to the fourth aspect or the first to the eighth possible implementations of the fourth aspect, in a ninth possible implementation of the fourth aspect, the first physical layer signaling is first DCI, the second physical layer signaling is second DCI, and the first DCI or the second DCI or both are unicast signaling, or the first DCI and the second DCI are same DCI and are multicast signaling.

According to a fifth aspect, a terminal device is provided, where the terminal device includes:

a receiving module, which may be specifically implemented by using a receiver, and configured to receive physical layer signaling sent by a network device, where the physical layer signaling includes configuration information, and the configuration information is used to indicate a time domain resource of a reference signal;

a determining module, which may be specifically implemented by using a processor, and configured to determine the time domain resource of the reference signal according to the configuration information received by the receiving module; and a sending module, which may be specifically implemented by using a transmitter, and configured to send the reference signal determined by the determining module and a first physical channel to the network device, where the reference signal is used for demodulation of the first physical channel.

With reference to the fifth aspect, in a first possible implementation of the fifth aspect, the configuration information is used to indicate one of N reference signal time domain configurations, where N is a positive integer, and any two of the N reference signal time domain configurations indicate different time domain resources occupied by the reference signal.

With reference to the fifth aspect, in a second possible implementation of the fifth aspect, the configuration information indicates that the reference signal and the first physical channel are located in a same transmission time interval TTI, or that the reference signal is located in a $k^{th}$ TTI before a TTI in which the first physical channel is located, where k is a positive integer.

With reference to the fifth aspect, in a third possible implementation of the fifth aspect, the reference signal and the first physical channel are located in a same TTI, and the configuration information is used to indicate that the reference signal is located on a first symbol or a last symbol in the TTI.

With reference to the fifth aspect, in a fourth possible implementation of the fifth aspect, the reference signal and the first physical channel are located in a same timeslot or subframe, and the configuration information is used to indicate that the reference signal is located on an $a^{th}$ symbol in the timeslot or a $b^{th}$ symbol in the subframe, where a is 1 or 4, and b is 1, 4, 8, or 11.

With reference to the fifth aspect, in a fifth possible implementation of the fifth aspect, the reference signal and the first physical channel are located in a same timeslot, and the configuration information is used to indicate that the reference signal is located on a first symbol in the timeslot or a first symbol and a fourth symbol in the timeslot.

With reference to the fifth aspect or the first to the fifth possible implementations of the fifth aspect, in a sixth possible implementation of the fifth aspect, the sending module is further configured to:

send a second physical channel to the network device, where the reference signal is used for demodulation of the second physical channel, and the first physical channel and the second physical channel are located in different TTIs.

With reference to the fifth aspect or the first to the sixth possible implementations of the fifth aspect, in a seventh possible implementation of the fifth aspect, the configuration information is further used to indicate that the reference signal is located on a subcarrier whose number is even or a subcarrier whose number is odd; and the determining module is specifically configured to:

determine the time domain resource of the reference signal according to the configuration information, and determine, according to the configuration information, that the reference signal is located on the subcarrier whose number is even or the subcarrier whose number is odd.

With reference to the fifth aspect or the first to the seventh possible implementations of the fifth aspect, in an eighth possible implementation of the fifth aspect, the physical layer signaling is downlink control information DCI, and the DCI is multicast signaling, or the DCI is unicast signaling.

According to a sixth aspect, a network device is provided, where the network device includes:

a sending module, which may be specifically implemented by using a transmitter, and configured to send first physical layer signaling to a first terminal device, where the first physical layer signaling includes first configuration information, and the first configuration information is used to indicate a time domain resource of a first reference signal;

a receiving module, which may be specifically implemented by using a receiver, and configured to receive the first reference signal and a first physical channel that are sent by the first terminal device; and a demodulation module, which may be specifically implemented by using a processor, and configured to demodulate the first physical channel according to the first reference signal received by the receiving module.

With reference to the sixth aspect, in a first possible implementation of the sixth aspect, the first configuration information is used to indicate one of N reference signal time domain configurations, where N is a positive integer, and any two of the N reference signal time domain configurations indicate different time domain resources occupied by the reference signal.

With reference to the sixth aspect, in a second possible implementation of the sixth aspect, the first configuration information indicates that the first reference signal and the first physical channel are located in a same transmission time interval TTI, or that the first reference signal is located in a $k^{th}$ TTI before a TTI in which the first physical channel is located, where k is a positive integer.

With reference to the sixth aspect, in a third possible implementation of the sixth aspect, the first reference signal and the first physical channel are located in a same TTI, and the first configuration information is used to indicate that the first reference signal is located on a first symbol or a last symbol in the TTI.

With reference to the sixth aspect, in a fourth possible implementation of the sixth aspect, the first reference signal and the first physical channel are located in a same timeslot or subframe, and the first configuration information is used to indicate that the first reference signal is located on an $a^{th}$ symbol in the timeslot or a $b^{th}$ symbol in the subframe, where a is 1 or 4, and b is 1, 4, 8, or 11.

With reference to the sixth aspect, in a fifth possible implementation of the sixth aspect, the first reference signal and the first physical channel are located in a same timeslot, and the first configuration information is used to indicate that the first reference signal is located on a first symbol in the timeslot or a first symbol and a fourth symbol in the timeslot.

With reference to the sixth aspect or the first to the fifth possible implementations of the sixth aspect, in a sixth possible implementation of the sixth aspect, the receiving module is further configured to:

receive a second physical channel sent by the first terminal device, where the first physical channel and the second physical channel are located in different TTIs; and the demodulation module is further configured to:

demodulate the second physical channel according to the first reference signal.

With reference to the sixth aspect or the first to the sixth possible implementations of the sixth aspect, in a seventh possible implementation of the sixth aspect, the first configuration information is further used to indicate that the first reference signal is located on a subcarrier whose number is even or a subcarrier whose number is odd.

With reference to the sixth aspect or the first to the seventh possible implementations of the sixth aspect, in an eighth possible implementation of the sixth aspect, the sending module is further configured to:

send second physical layer signaling to a second terminal device, where the second physical layer signaling includes second configuration information, and the second configuration information is used to indicate a time domain resource of a second reference signal;

the receiving module is further configured to:

receive the second reference signal and a third physical channel that are sent by the second terminal device, where the second reference signal and the first reference signal are located on a same time domain resource, and the first physical channel and the third physical channel are located in different TTIs; and the demodulation module is further configured to:

demodulate the third physical channel according to the second reference signal.

With reference to the sixth aspect or the first to the eighth possible implementations of the sixth aspect, in a ninth possible implementation of the sixth aspect, the first physical layer signaling is first DCI, the second physical layer signaling is second DCI, and the first DCI or the second DCI or both are unicast signaling, or the first DCI and the second DCI are same DCI and are multicast signaling.

According to a seventh aspect, a reference signal transmission system is provided, where the system includes a terminal device and a network device, where the terminal device is configured to: receive physical layer signaling sent by the network device, where the physical layer signaling includes configuration information, and the configuration information is used to indicate a time domain resource of a reference signal; determine the time domain resource of the reference signal according to the configuration information; and send the reference signal and a first physical channel to the network device, where the reference signal is used for demodulation of the first physical channel; and the network device is configured to: send the physical layer signaling to the terminal device, where the physical layer signaling includes the configuration information, and the configuration information is used to indicate the time domain resource of the reference signal; receive the reference signal and the first physical channel that are sent by the terminal device; and demodulate the first physical channel according to the reference signal.

Beneficial effects brought by the technical solutions provided in the embodiments of the present invention are as follows:

In the embodiments of the present invention, the network device sends the first physical layer signaling to the first terminal device, where the first physical layer signaling includes configuration information used to indicate the time domain resource of the first reference signal; and then the first terminal device may determine the time domain resource of the first reference signal and/or a time domain resource of the first physical channel according to the configuration information. Therefore, the network device can dynamically configure the time domain resource of the reference signal, so as to improve flexibility of reference signal configuration. For example, to reduce reference signal overheads, and increase a system capacity, the network device may configure, particularly when a length of the TTI is less than 1 ms, that one reference signal is used for demodulation of a plurality of physical channels. For example, when channel estimation performance is poor, and reference signal overheads need to be increased, the network device may configure, in one timeslot, that a reference signal occupies a time domain resource of at least two symbols.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 5 (b) is a schematic diagram of a reference signal time domain configuration according to an embodiment of the present invention;

FIG. 6 (b) is a schematic diagram of a reference signal time domain configuration according to an embodiment of the present invention;

FIG. 6 (c) is a schematic diagram of a reference signal time domain configuration according to an embodiment of the present invention;

FIG. 6 (d) is a schematic diagram of a reference signal time domain configuration according to an embodiment of the present invention;

FIG. 7 (b) is a schematic diagram of a reference signal time domain configuration according to an embodiment of the present invention;

FIG. 8 (b) is a schematic diagram of a reference signal time domain configuration according to an embodiment of the present invention;

FIG. 9 (b) is a schematic diagram of a reference signal time domain configuration according to an embodiment of the present invention;

FIG. 9 (c) is a schematic diagram of a reference signal time domain configuration according to an embodiment of the present invention;

FIG. 9 (d) is a schematic diagram of a reference signal time domain configuration according to an embodiment of the present invention;

FIG. 10 (a) is a schematic diagram of a reference signal time domain configuration according to an embodiment of the present invention;

FIG. 10 (b) is a schematic diagram of a reference signal time domain configuration according to an embodiment of the present invention;

FIG. 11 is a schematic diagram of a reference signal time domain configuration according to an embodiment of the present invention;

FIG. 12 is a flowchart of a reference signal transmission method according to an embodiment of the present invention;

DESCRIPTION OF EMBODIMENTS

To make the objectives, technical solutions, and advantages of the present disclosure clearer, the following further describes the implementations of the present disclosure in detail with reference to the accompanying drawings.

Figure 1:
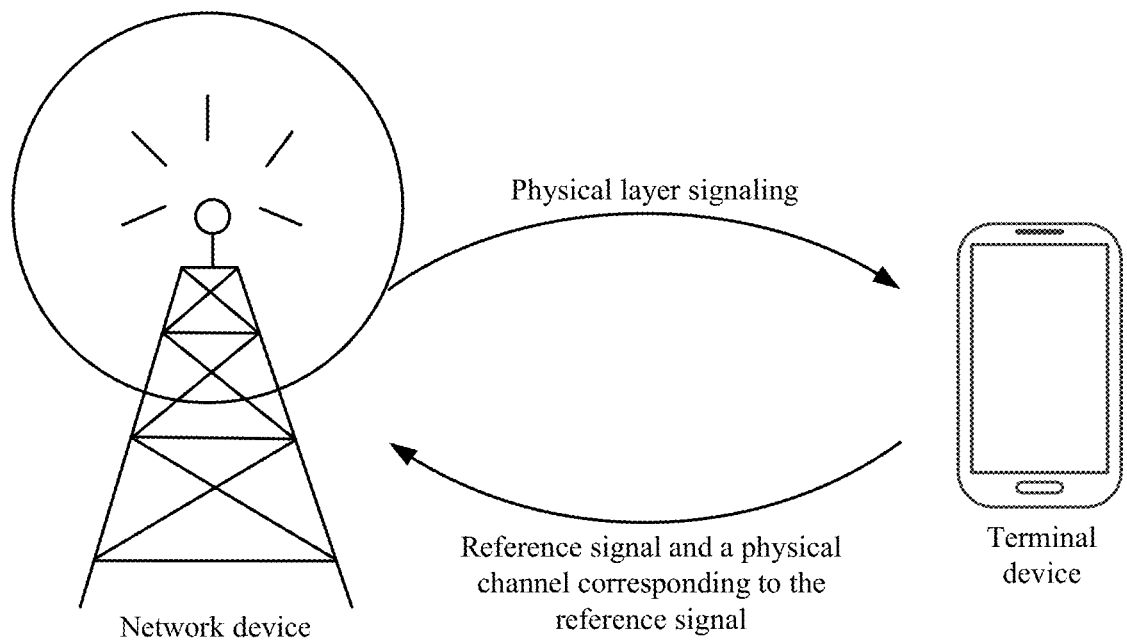
FIG. 1 is a schematic diagram of a system framework according to an embodiment of the present invention.

An embodiment of the present invention provides a reference signal transmission method. The method may be implemented jointly by using a terminal device and a network device. The terminal device may also be referred to as user equipment (UE), a mobile station (MS), a mobile terminal, or the like. The terminal device may communicate with one or more core networks by using a radio access network (RAN). For example, the terminal device may be a mobile phone (or referred to as a "cellular" phone), a computer with a mobile terminal, or the like. For example, the terminal device may also be a portable, pocket-sized, handheld, computer built-in, or in-vehicle mobile apparatus, which exchanges voice and/or data with the radio access network. The network device may be a base station. The base station may be a base transceiver station (BTS) in GSM or CDMA, or a NodeB NB) in WCDMA, or an evolved NodeB (eNodeB) in LTE. As shown in FIG. 1, the network device may send DCI to the terminal device; after receiving the DCI sent by the network device, the terminal device may determine a time domain resource of a reference signal according to configuration information for the time domain resource of the reference signal indicated by the DCI, and send the reference signal and a physical channel corresponding to the reference signal to the network device; and the network device may receive the reference signal and the physical channel corresponding to the reference signal that are sent by the terminal device, so as to demodulate the physical channel according to the reference signal.

Figure 2:
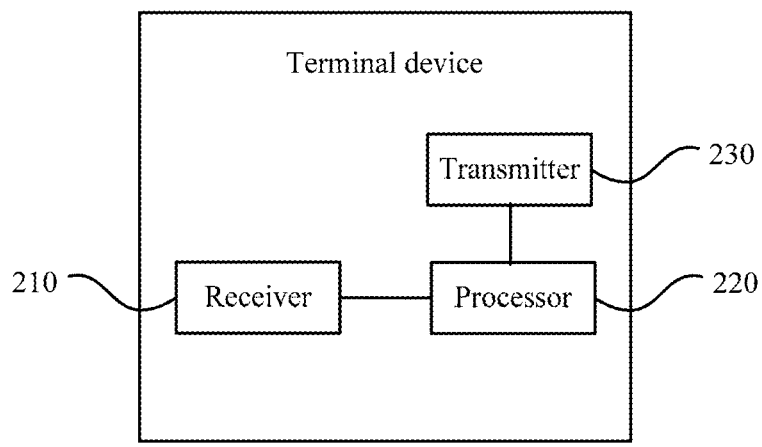
FIG. 2 is a schematic structural diagram of a terminal device according to an embodiment of the present invention.

As shown in FIG. 2, the terminal device may include a receiver 210, a processor 220, and a transmitter 230, and the receiver 210 and the transmitter 230 may be connected to the processor 220. The receiver 210 may be configured to receive a message or data, and the receiver 210 may include but is not limited to an antenna, at least one amplifier, a tuner, one or more oscillators, a coupler, an low noise amplifier (LNA), a duplexer, and the like. The processor 220 may be a control center of the terminal device, and connect to parts, such as the receiver 210 and the transmitter 230, of the entire terminal device by using various interfaces and circuits. In the present disclosure, the processor 220 may be configured to execute processing related to determining of the time domain resource of the reference signal. Optionally, the processor 220 may include one or more processing units. Preferably, the processor 220 may be integrated with an application processor and a modem processor. The application processor mainly processes an operating system, and the modem processor mainly processes wireless communication. The processor 220 may also be a digital signal processor, an application-specific integrated circuit, a field programmable gate array, another programmable logic device, or the like.

Figure 3:
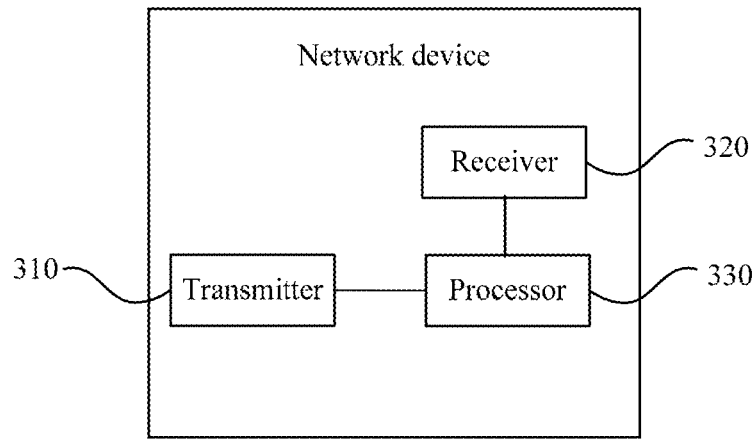
FIG. 3 is a schematic structural diagram of a network device according to an embodiment of the present invention.

As shown in FIG. 3, the network device may include a transmitter 310, a receiver 320, and a processor 330. The transmitter 310 and the receiver 320 may be connected to the processor 330. The receiver 320 may be configured to receive a message or data, and the receiver 320 may include but is not limited to an antenna, at least one amplifier, a tuner, one or more oscillators, a coupler, an low noise amplifier (LNA), a duplexer, and the like. In the present disclosure, the processor 330 may be configured to execute processing related to demodulation of a physical channel according to a reference signal. The processor 330 may include one or more processing units. The processor 330 may be a general purpose processor, such as a central processing unit (CPU) or a network processor (NP), or may be a digital signal processor (DSP), an application-specific integrated circuit (ASIC), a field programmable gate array (FPGA), another programmable logic device, or the like. Specifically, a program may include program code, and the program code includes a computer operation instruction.

The technical solutions of the embodiments of the present invention may be applied to various communications systems, such as a Global System for Mobile Communications GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, LTE time division duplex (TDD) system, and a Universal Mobile Telecommunications System (UMTS), and another wireless communications system using an orthogonal frequency division multiplexing (OFDM) technology.

To facilitate an understanding of the embodiments of the present invention, the following first describes basic concepts in the embodiments of the present invention. The LTE system is used as an example for description. However, this does not mean that the embodiments of the present invention are applicable only to the LTE system. Actually, the solutions provided in the embodiments of the present invention can be used in any wireless communications system that performs data transmission by means of scheduling.

1. Frame Structure

In the LTE system, each radio frame includes 10 subframes, and each subframe is 1 ms long and includes two timeslots (also refers as slot).

For a normal cyclic prefix (normal CP), each slot includes seven symbols, that is, each slot includes symbols with numbers {#0, #1, #2, #3, #4, #5, #6}. For an extended cyclic prefix (extended CP), each slot includes six symbols, that is, each slot includes symbols with numbers {#0, #1, #2, #3, #4, #5}.

In the embodiments of the present invention, an uplink symbol and a downlink symbol are both referred to as a symbol for short. The uplink symbol is referred to as a single carrier frequency division multiple access (SC-FDMA) symbol, and the downlink symbol is referred to as an orthogonal frequency division multiplexing (OFDM) symbol. It should be noted that, if an uplink multiple access manner of orthogonal frequency division multiple access (OFDMA) is introduced in a subsequent technology, the uplink symbol may also be referred to as an OFDM symbol. The uplink multiple access manner and a downlink multiple access manner are not limited in the present invention.

2. Physical Channel and Reference Signal

A physical channel carries data information from higher layers. The physical channel may be a physical uplink shared channel (PUSCH), a physical uplink control channel (PUCCH), or a physical downlink shared channel (PDSCH).

A reference signal (RS) is used for channel estimation or channel measurement. For example, the reference signal may be a demodulation reference signal (DMRS) used for an uplink, a sounding reference signal (SRS), a cell-specific reference signal (CRS) used for a downlink, a UE-specific reference signal (URS) used for a downlink, or a group-specific reference signal (GRS) used for a downlink. A DMRS used for PUCCH demodulation is referred to as a PUCCH DMRS, and a DMRS used for PUSCH demodulation is referred to as a PUSCH DMRS. The CRS is an RS configured by a network device for all terminal devices in a cell, the GRS is an RS configured by the network device for a group of terminal devices, and the URS is an RS configured for a specific terminal device.

Each physical channel has a corresponding RS, so that the network device can perform channel estimation according to the RS, and then demodulate the physical channel according to an estimated channel value. Therefore, in the present disclosure, an RS corresponding to a physical channel is an RS used for demodulation of the physical channel.

The following describes a processing procedure shown in FIG. 4 in detail with reference to specific implementations, and content of the processing procedure may be as follows:

Step 401: A terminal device receives physical layer signaling sent by a network device, where the physical layer signaling includes configuration information, and the configuration information is used to indicate a time domain resource of a reference signal.

Step 402: The terminal device determines the time domain resource of the reference signal and/or a time domain resource of a first physical channel according to the configuration information.

Step 403: The terminal device sends the first physical channel to the network device, or the terminal device receives the first physical channel sent by the network device, where the reference signal is used for demodulation of the first physical channel.

The physical layer signaling includes the configuration information, and the configuration information is used to indicate the time domain resource of the reference signal, that is, the physical layer signaling includes information used to indicate the time domain resource of the reference signal. Optionally, the configuration information may explicitly indicate the time domain resource of the reference signal. Optionally, the configuration information may implicitly indicate the time domain resource of the reference signal. For example, the configuration information directly indicates a time domain resource occupied by the first physical channel, and further, the time domain resource occupied by the first physical channel may implicitly correspond to the time domain resource occupied by the reference signal.

The reference signal is used for demodulation of the first physical channel. Optionally, the first physical channel is an uplink physical channel, for example, a PUSCH. In this case, the network device demodulates the first physical channel according to the reference signal. Optionally, the first physical channel is a downlink physical channel, for example, a PDSCH. In this case, the terminal device demodulates the first physical channel according to the reference signal.

Optionally, the physical layer signaling is DCI. In this case, the terminal device receives the DCI sent by the network device. The DCI includes the configuration information, and the configuration information is used to indicate the time domain resource of the reference signal. Optionally, the DCI is further used to indicate transmission of the first physical channel, that is, the DCI is further used to schedule the first physical channel. Optionally, the DCI is carried on a physical downlink control channel (PDCCH), and the PDCCH may be a PDCCH defined in the Rel-8, an EPDCCH defined in the Rel-11, or a channel that is used to carry the DCI and that is defined in another release. Optionally, the DCI is semi-persistent scheduling (SPS) DCI.

Optionally, the physical layer signaling is multicast signaling, that is, the physical layer signaling is sent to a group of terminal devices, or the physical layer signaling is unicast signaling, that is, the physical layer signaling is sent to one terminal device.

Optionally, in this embodiment of the present invention, a length of a TTI is less than 1 ms. For example, the length of the TTI is 0.5 ms, a length of one symbol, a length of two symbols, a length of three symbols, or a length of four symbols.

Optionally, the configuration information is used to indicate one of N reference signal time domain configurations, where N is a positive integer, and any two of the N reference signal time domain configurations indicate different time domain resources occupied by the reference signal. That is, the reference signal may occupy N different time domain resources.

Optionally, the N reference signal time domain configurations are predefined. The terminal device may prestore the N reference signal time domain configurations, and then the terminal device receives the physical layer signaling sent by the network device, and determines, according to the configuration information included in the physical layer signaling, the time domain resource occupied by the reference signal.

Optionally, the terminal device receives higher layer signaling sent by the network device, and the higher layer signaling is used to indicate the N reference signal time domain configurations. Then, the terminal device receives the physical layer signaling sent by the network device, and determines, according to the configuration information included in the physical layer signaling, the time domain resource occupied by the reference signal.

Optionally, the configuration information included in the DCI received by the terminal device may indicate one of N reference signal time domain configurations, where N is a positive integer. The configuration information is $\log_2(N)$ or $\lceil \log_2(N) \rceil$ bits, that is, N states of $\lceil \log_2(N) \rceil$ or $\lceil \log_2(N) \rceil$ bits correspond to N reference signal time domain resource configurations, where [*] denotes rounding up. For example, when N is 4, values of 2 bits may be used to indicate reference signal time domain configurations, that is, four different reference signal time domain configurations may be indicated by using four states: 00, 01, 10, and 11.

During implementation, after receiving the physical layer signaling that includes the configuration information and that is sent by the network device, the terminal device may determine the time domain resource of the reference signal and/or the time domain resource of the first physical channel according to the configuration information. For example, when the configuration information indicates that the reference signal and the first physical channel are located in a same TTI, the first physical channel occupies all symbols in the TTI except a symbol occupied by the reference signal; or when the configuration information indicates that the reference signal and the first physical channel are located in different TTIs, the first physical channel occupies all symbols in a TTI in which the first physical channel is located.

The following specifically describes several optional time domain resources that are of the reference signal and indicated by the configuration information for the time domain resource of the reference signal.

Optionally, the configuration information indicates that the reference signal and the first physical channel are located in a same transmission time interval TTI, or that the reference signal is located in a $k^{th}$ TTI before the TTI in which the first physical channel is located, where k is a positive integer.

During implementation, the terminal device determines, according to the configuration information, that the reference signal and the first physical channel are located in the same TTI, or that the reference signal is located in the $k^{th}$ TTI before the TTI in which the first physical channel is located, where k is a positive integer. For example, k is 1, 2, or 3. In other words, the terminal device determines, according to the configuration information for the time domain resource of the reference signal, that the reference signal is located in a $k^{th}$ TTI before the TTI in which the first physical channel is located, where k is a nonnegative integer. For example, k is 0, 1, 2, or 3. Optionally, when the configuration information indicates that k is 0, the terminal device determines that the first physical channel occupies some symbols in the TTI in which the first physical channel is located (the reference signal does not occupy the some symbols); or when the configuration information indicates that k is greater than 0, the terminal device determines that the first physical channel occupies all symbols in the TTI in which the first physical channel is located.

Based on a relationship between the TTI in which the reference signal is located and the TTI in which the first physical channel is located, the following provides several optional reference signal time domain configuration solutions.

Figure 5:
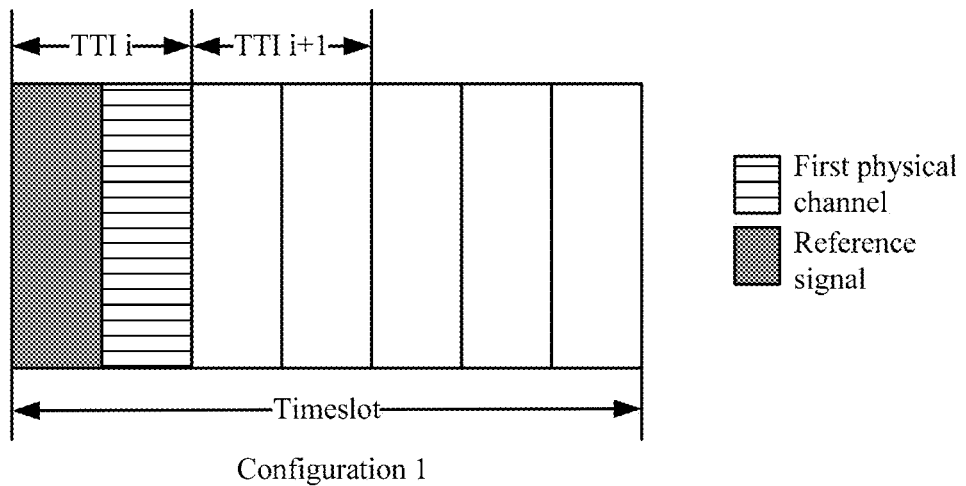
FIG. 5 (a) is a schematic diagram of a reference signal time domain configuration according to an embodiment of the present invention.
Figure 5:
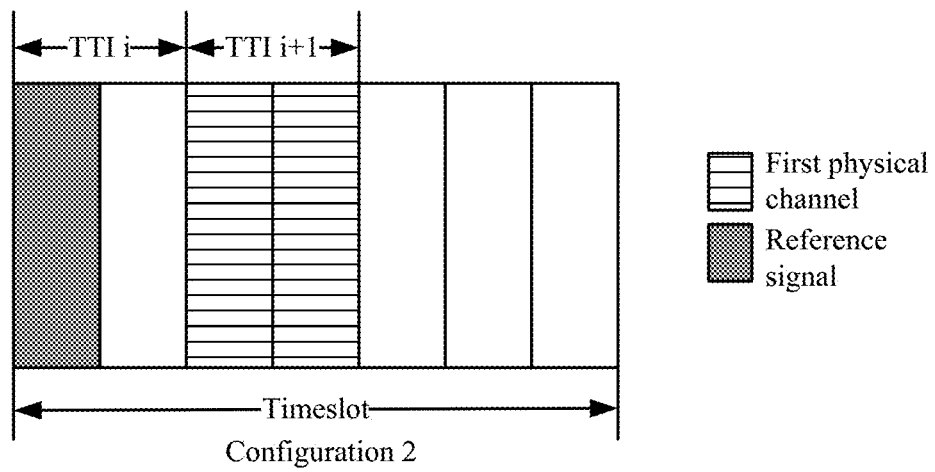

Solution 1: N is 2. In this case, the configuration information is 1 bit, that is, two different states of the 1 bit may indicate two different reference signal time domain configurations. Specifically, a value "0" of the 1 bit may indicate a configuration 1, and a value "1" of the 1 bit may indicate a configuration 2; or a value "1" of the 1 bit may indicate a configuration 1, and a value "0" of the 1 bit may indicate a configuration 2. As shown in FIG. 5 (*a*), the configuration 1 may be that the reference signal and the first physical channel are located in a same TTI. The configuration 2 may be that the reference signal and the first physical channel are located in different TTIs. For example, as shown in FIG. 5 (*b*), the reference signal may be located in a TTI before the TTI in which the first physical channel is located. In this case, the time domain resource that is occupied by the reference signal and indicated by the configuration information may be the configuration 1 or the configuration 2.

Figure 6:
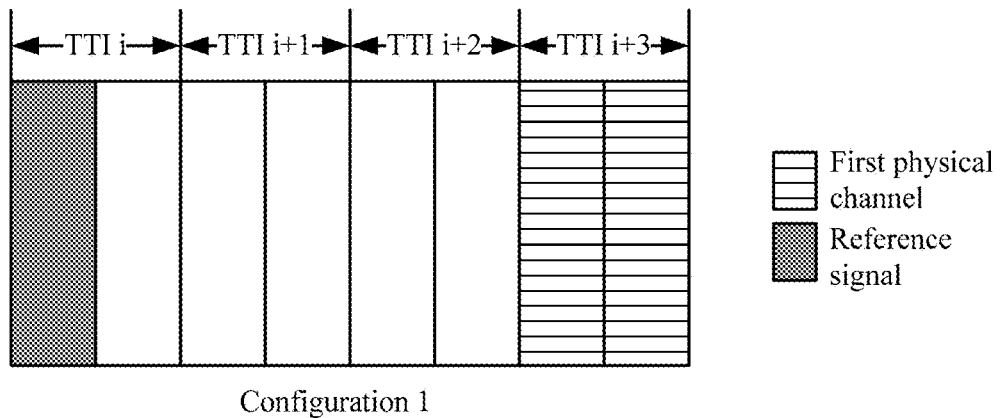
FIG. 6 (a) is a schematic diagram of a reference signal time domain configuration according to an embodiment of the present invention.
Figure 6:
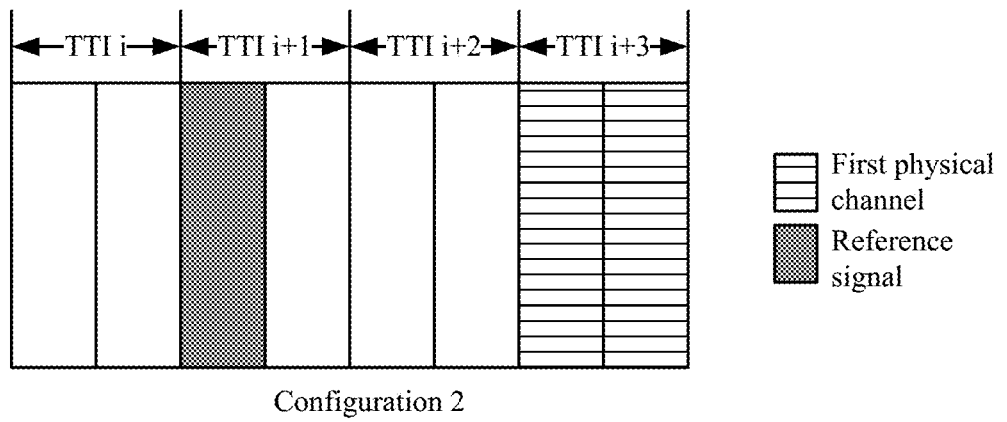
Figure 6:
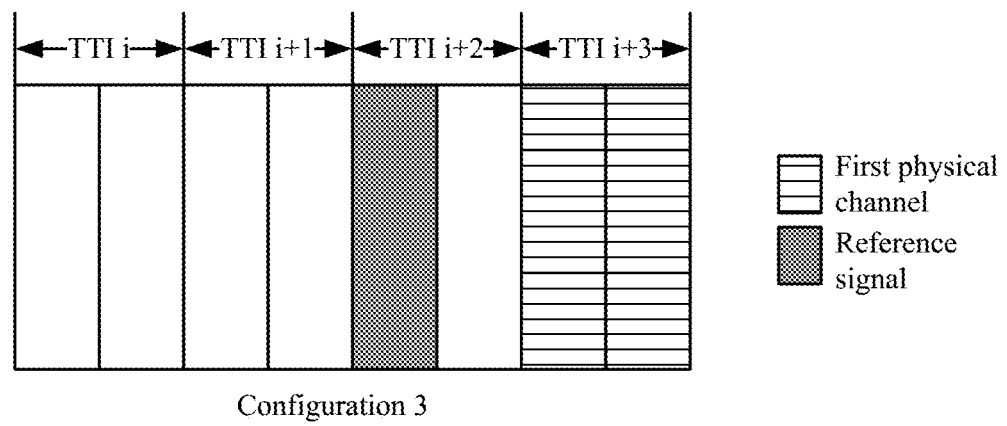
Figure 6:
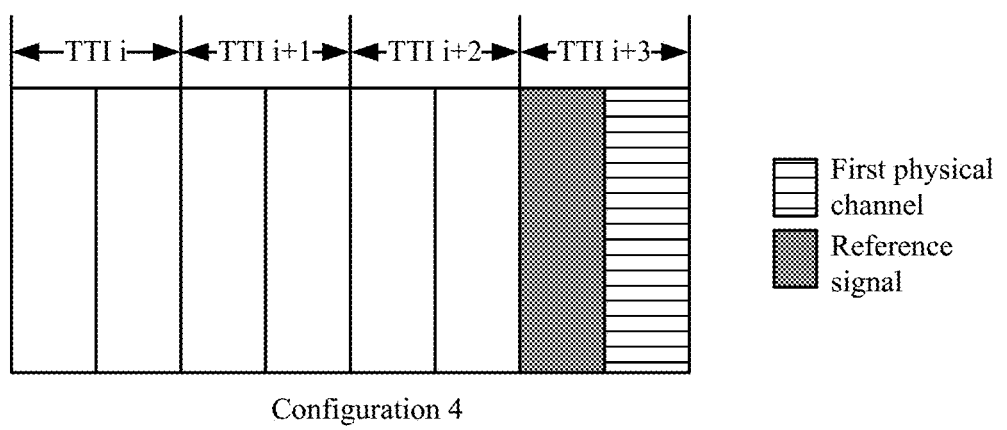

Solution 2: N is 4. In this case, the configuration information is 2 bits, that is, four different states of the 2 bits may indicate four different reference signal time domain configurations. Specifically, the four different reference signal time domain configurations may be that the reference signal is located in a $k^{th}$ TTI before the TTI in which the first physical channel is located, where k is a natural number, and k may be 0, 1, 2, or 3. That is, the four different reference signal time domain configurations may be as follows: the reference signal is located in the third TTI before the TTI in which the first physical channel is located; the reference signal is located in the second TTI before the TTI in which the first physical channel is located; the reference signal is located in the first TTI before the TTI in which the first physical channel is located; and the reference signal and the first physical channel are located in the same TTI. For example, if the first physical channel is located in a TTI i+3, a configuration 1 may be that the reference signal is located in a TTI i, as shown in FIG. 6 (a); a configuration 2 may be that the reference signal is located in a TTI i+1, as shown in FIG. 6 (b); a configuration 3 may be that the reference signal is located in a TTI i+2, as shown in FIG. 6 (c); and a configuration 4 may be that the reference signal is located in the TTI i+3, that is, the reference signal and the first physical channel are located in the same TTI, as shown in FIG. 6 (d). The TTI i, the TTI i+1, the TTI i+2, and the TTI i+3 may be located in a same subframe, or may be located in different subframes. This is not limited in the present invention. In this case, the time domain resource that is occupied by the reference signal and indicated by the configuration information is one of the four configurations. The network device may select one of the configurations according to a requirement, and notify the terminal device by using the physical layer signaling.

Optionally, the reference signal and the first physical channel are located in the same TTI, and the configuration information is used to indicate that the reference signal is located on a first symbol or a last symbol in the TTI.

During implementation, the terminal device determines, according to the configuration information, that the reference signal and the first physical channel are located in the same TTI, and that the reference signal is located on the first symbol or the last symbol in the TTI. That is, the reference signal is located on a symbol before the first physical channel, or the reference signal is located on a symbol after the first physical channel. Optionally, the terminal device determines, according to the configuration information, that the first physical channel does not occupy the first symbol or the last symbol in the TTI. This reference signal time domain configuration solution may be referred to as a solution 3. The following describes the solution 3 by using an example.

Figure 7:
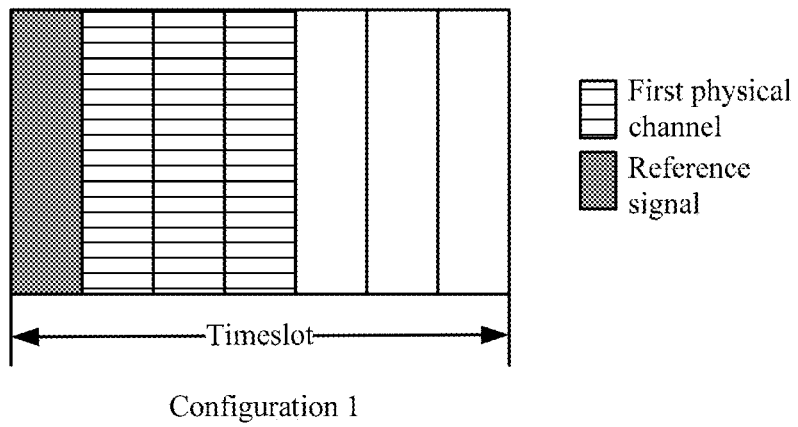
FIG. 7 (a) is a schematic diagram of a reference signal time domain configuration according to an embodiment of the present invention.
Figure 7:
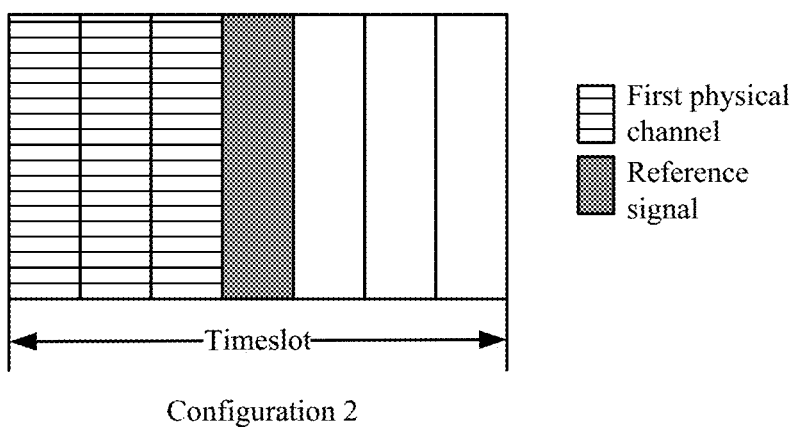

Solution 3: N is 2. In this case, the configuration information is 1 bit. An indication method of the 1 bit is the same as the solution 1. Details are not described herein again. A configuration 1 may be that the reference signal is located on a first symbol in the TTI; and a configuration 2 may be that the reference signal is located on a last symbol in the TTI. For example, if the TTI includes four symbols, and the first physical channel occupies three symbols, the reference signal may be located on a first symbol in the TTI, as shown in FIG. 7 (a); or the reference signal may be located on a fourth symbol in the TTI, as shown in FIG. 7 (b).

Optionally, the configuration information is used to indicate that the reference signal is located on an $a^{th}$ symbol in a timeslot or a $b^{th}$ symbol in a subframe, where a is a positive integer that is not greater than 6 or 7, and b is a positive integer that is not greater than 12 or 14. For example, a is 1 or 4, and b is 1, 4, 8, or 11. For another example, a is 1 or 3, and b is 1, 3, 7, or 9. Preferably, the reference signal and the first physical channel are located in a same timeslot or subframe.

During implementation, the terminal device determines, according to the configuration information, that the reference signal is located on an $a^{th}$ symbol in a timeslot or a $b^{th}$ symbol in a subframe, where the timeslot or subframe is a timeslot or subframe in which the first physical channel is located. For example, the configuration information may be used to indicate that the reference signal is located on a first symbol or a fourth symbol in the timeslot in which the first physical channel is located. For example, the configuration information may be used to indicate that the reference signal is located on a first symbol, a fourth symbol, an eighth symbol, or an eleventh symbol in the subframe in which the first physical channel is located. Optionally, the terminal device determines, according to the configuration information, that the first physical channel does not occupy the $a^{th}$ symbol in the timeslot or the $b^{th}$ symbol in the subframe. This reference signal time domain configuration solution may be referred to as a solution 4 or a solution 5. The following describes the solution 4 or the solution 5 by using an example.

Figure 8:
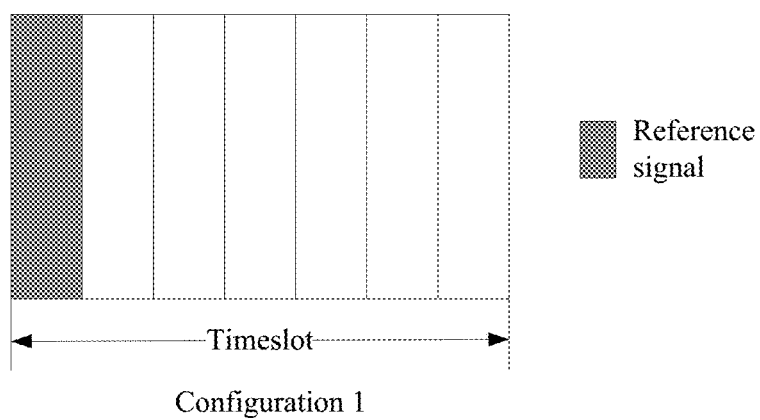
FIG. 8 (a) is a schematic diagram of a reference signal time domain configuration according to an embodiment of the present invention.
Figure 8:
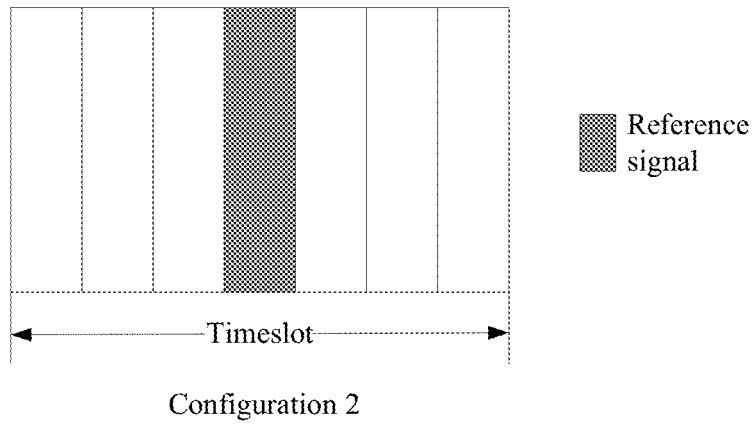

Solution 4: N is 2. In this case, the configuration information is 1 bit. An indication method of the 1 bit is the same as the solution 1. Details are not described herein again. A configuration 1 may be that the reference signal is located on the first symbol in the timeslot, as shown in FIG. 8 (a); and a configuration 2 may be that the reference signal is located on the fourth symbol in the timeslot, as shown in FIG. 8 (b).

Figure 9:
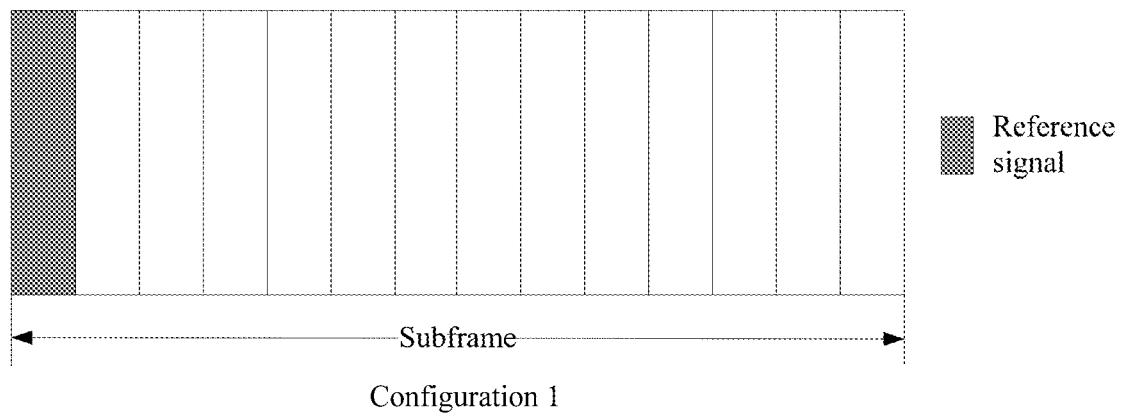
FIG. 9 (a) is a schematic diagram of a reference signal time domain configuration according to an embodiment of the present invention.
Figure 9:
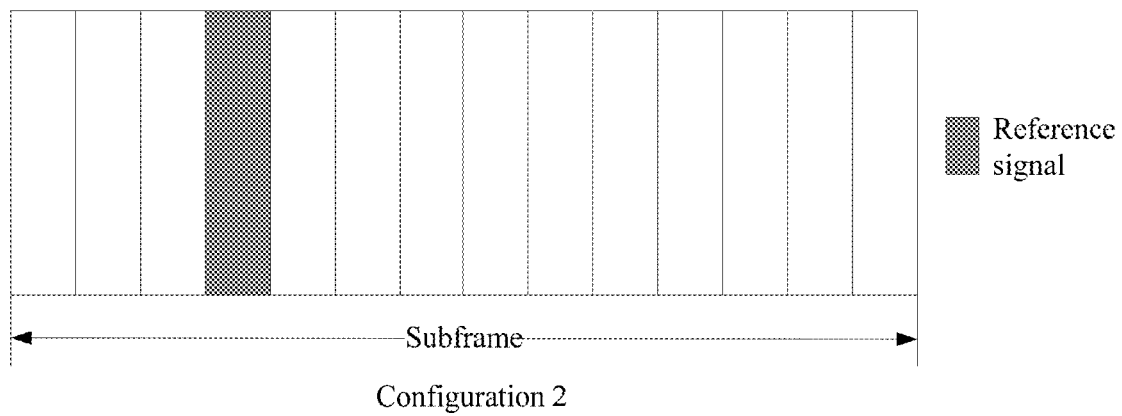

Solution 5: N is 4. In this case, values of 2 bits may be used to indicate reference signal time domain configurations, that is, four different states of the 2 bits may indicate four different reference signal time domain configurations. Specifically, the four different reference signal time domain configurations may be as follows: the reference signal is located on the first symbol in the subframe in which the first physical channel is located, as shown in FIG. 9 (a); the reference signal is located on the fourth symbol in the subframe in which the first physical channel is located, as shown in FIG. 9 (b); the reference signal is located on the eighth symbol in the subframe in which the first physical channel is located, as shown in FIG. 9 (c); and the reference signal is located on the eleventh symbol in the subframe in which the first physical channel is located, as shown in FIG. 9 (d). The network device may select one of the configurations according to a requirement, and notify the terminal device by using the physical layer signaling.

Optionally, the configuration information is used to indicate that the reference signal is located on c symbols in a timeslot or d symbols in a subframe, where c is a positive integer that is not greater than 6 or 7, and d is a positive integer that is not greater than 12 or 14. Preferably, the reference signal and the first physical channel are located in a same timeslot or subframe. For example, c is 1 or 2, and the configuration information is used to indicate that the reference signal is located on a first symbol in the timeslot or a first symbol and a fourth symbol in the timeslot. For example, d is 2 or 4, and the configuration information is used to indicate that the reference signal is located on a first symbol and an eighth symbol in the subframe, or a first symbol, a fourth symbol, an eighth symbol, and an eleventh symbol in the subframe.

During implementation, the terminal device determines, according to the configuration information, that the reference signal is located on the c symbols in the timeslot or the d symbols in the subframe, where the timeslot or subframe is a timeslot or subframe in which the first physical channel is located. Optionally, the terminal device determines, according to the configuration information, that the first physical channel does not occupy the c symbols in the timeslot or the d symbols in the subframe. This reference signal time domain configuration solution may be referred to as a solution 6 or a solution 7. The following describes the solution 6 or the solution 7 by using an example.

Solution 6: N is 2. In this case, the configuration information is 1 bit. An indication method of the 1 bit is the same as the solution 1. Details are not described herein again. A configuration 1 may be that the reference signal is located on the first symbol in the timeslot, as shown in FIG. 10 (*a*); and a configuration 2 may be that the reference signal is located on the first symbol and the fourth symbol in the timeslot, as shown in FIG. 10 (*b*).

Solution 7: N is 2. In this case, the configuration information for the time domain resource of the reference signal is 1 bit. An indication method of the 1 bit is the same as the solution 1. Details are not described herein again. A configuration 1 may be that the reference signal is located on the first symbol and the eighth symbol in the subframe; and a configuration 2 may be that the reference signal is located on the first symbol, the fourth symbol, the eighth symbol, and the eleventh symbol in the subframe.

Optionally, the configuration information is further used to indicate a frequency domain resource of the reference signal. Correspondingly, a processing process in step 402 may be as follows: the terminal device determines the time domain resource and the frequency domain resource of the reference signal according to the configuration information. Optionally, the configuration information includes one or more information fields. For example, the configuration information includes one information field, and the information field indicates the time domain resource and the frequency domain resource of the reference signal in a joint manner. For example, the configuration information includes two information fields, one of which is used to indicate the time domain resource of the reference signal (for details about a quantity of bits included in the information field and a manner of indicating the time domain resource of the reference signal, refer to the foregoing solutions), and the other is used to indicate the frequency domain resource of the reference signal.

Optionally, the configuration information may be further used to indicate that the reference signal is located on a subcarrier whose number is even or a subcarrier whose number is odd. Correspondingly, a processing process in step 402 may be as follows: the terminal device determines the time domain resource of the reference signal according to the configuration information, and determines, according to the configuration information, that the reference signal is located on the subcarrier whose number is even or the subcarrier whose number is odd. Optionally, the configuration information includes one or more information fields. For specific content, refer to the foregoing embodiments. Details are not described herein again.

Optionally, the first physical channel is an uplink physical channel (for example, a PUSCH or a PUCCH), and step 403 includes: sending, by the terminal device, the reference signal and the first physical channel to the network device, where the reference signal is used for demodulation of the first physical channel. It should be noted that, there is no time sequence relationship between sending of the reference signal and sending of the first physical channel. That is, the terminal device may first send the reference signal and then send the first physical channel, or first send the first physical channel and then send the reference signal.

Optionally, the first physical channel is a downlink physical channel (for example, a PDSCH), and step 403 includes: receiving, by the terminal device, the reference signal and the first physical channel that are sent by the network device, where the reference signal is used for demodulation of the first physical channel. It should be noted that, there is no time sequence relationship between receiving of the reference signal and receiving of the first physical channel.

Optionally, the first physical channel is an uplink physical channel (for example, a PUSCH or a PUCCH), and before or when the terminal device receives the physical layer signaling sent by the network device, the processing procedure further includes: sending, by the terminal device, the reference signal to the network device. In this case, step 403 includes: sending, by the terminal device, the first physical channel to the network device. It should be noted that, because the reference signal may be located in the $k^{th}$ TTI (k is greater than 0) before the TTI in which the first physical channel is located, the reference signal indicated by the physical layer signaling received by the terminal device may be a reference signal that has been sent or is being sent by the terminal device. This solution is applicable to a case in which a reference signal corresponding to a physical channel scheduled by current physical layer signaling is the same as a reference signal corresponding to a physical channel scheduled by previous physical layer signaling. In this case, before or when the terminal device receives the current physical layer signaling, the reference signal corresponding to the physical channel scheduled by the current physical layer signaling has been sent to the network device. Therefore, for the current physical layer signaling, the terminal device may send only the physical channel.

Optionally, the first physical channel is a downlink physical channel (for example, a PDSCH), and before or when the terminal device receives the physical layer signaling sent by the network device, the processing procedure further includes: receiving, by the terminal device, the reference signal sent by the network device. In this case, step 403 includes: receiving, by the terminal device, the first physical channel sent by the network device. It should be noted that, because the reference signal may be located in the $k^{th}$ TTI (k is greater than 0) before the TTI in which the first physical channel is located, the reference signal indicated by the physical layer signaling received by the terminal device may be a reference signal that has been received or is being received by the terminal device.

Optionally, the terminal device may further send a second physical channel to the network device. Correspondingly, a processing process may be as follows: the terminal device sends the second physical channel to the network device, where the reference signal is used for demodulation of the second physical channel, and the first physical channel and the second physical channel are located in different TTIs. In this case, the first physical channel and the second physical channel correspond to the same reference signal, and the reference signal has been sent to the network device. Therefore, in this case, the terminal device may send only the second physical channel.

Optionally, the terminal device may further receive a second physical channel sent by the network device. Correspondingly, a processing process may be as follows: the terminal device receives the second physical channel sent by the network device, where the reference signal is used for demodulation of the second physical channel, and the first physical channel and the second physical channel are located in different TTIs.

Based on the foregoing configuration manner of a time domain resource of a reference signal, for a same terminal device, even if the network device needs to configure that different physical channels are located in different TTIs, a same reference signal can be configured for the different physical channels. For example, as shown in FIG. 11, a first physical channel and a second physical channel that are scheduled to a same terminal device are located on different symbols, and a reference signal corresponding to the first physical channel and a reference signal corresponding to the second physical channel are a same reference signal, that is, the reference signals corresponding to the first physical channel and the second physical channel are located on a same time domain resource. In the prior art, each physical channel needs to correspond to at least one reference signal, that is, two different physical channels need at least two reference signals. Compared with the prior art, the configuration manner in the present invention can reduce reference signal overheads.

In this embodiment of the present invention, the terminal device receives the physical layer signaling sent by the network device, where the physical layer signaling includes the configuration information used to indicate the time domain resource of the reference signal; and then determines the time domain resource of the reference signal and/or the time domain resource of the first physical channel according to the configuration information. Therefore, the network device can dynamically configure the time domain resource of the reference signal, so as to improve flexibility of reference signal configuration. For example, to reduce reference signal overheads, and increase a system capacity, the network device may configure, particularly when a length of the TTI is less than 1 ms, that one reference signal is used for demodulation of a plurality of physical channels. For example, when channel estimation performance is poor, and reference signal overheads need to be increased, the network device may configure, in one timeslot, that a reference signal occupies a time domain resource of at least two symbols.

The following describes a processing procedure shown in FIG. 12 in detail with reference to specific implementations, and content of the processing procedure may be as follows:

Step 1201: A network device sends first physical layer signaling to a first terminal device, where the first physical layer signaling includes first configuration information, and the first configuration information is used to indicate a time domain resource of a first reference signal.

Step 1202: The network device receives a first physical channel sent by the first terminal device, and demodulates the first physical channel according to the first reference signal; or the network device sends a first physical channel to the first terminal device, where the first reference signal is used for demodulation of the first physical channel.

It should be noted that, in this embodiment of the present invention, the first physical layer signaling, first DCI, the first configuration information, and the first reference signal correspond to the physical layer signaling, the DCI, the configuration information, and the reference signal in step 401 to step 403, respectively. Therefore, unless otherwise specified, the content of the first physical layer signaling, the first DCI, the first configuration information, and the first reference signal is consistent with the content of the physical layer signaling, the DCI, the configuration information, and the reference signal in step 401 to step 403.

Figure 4:
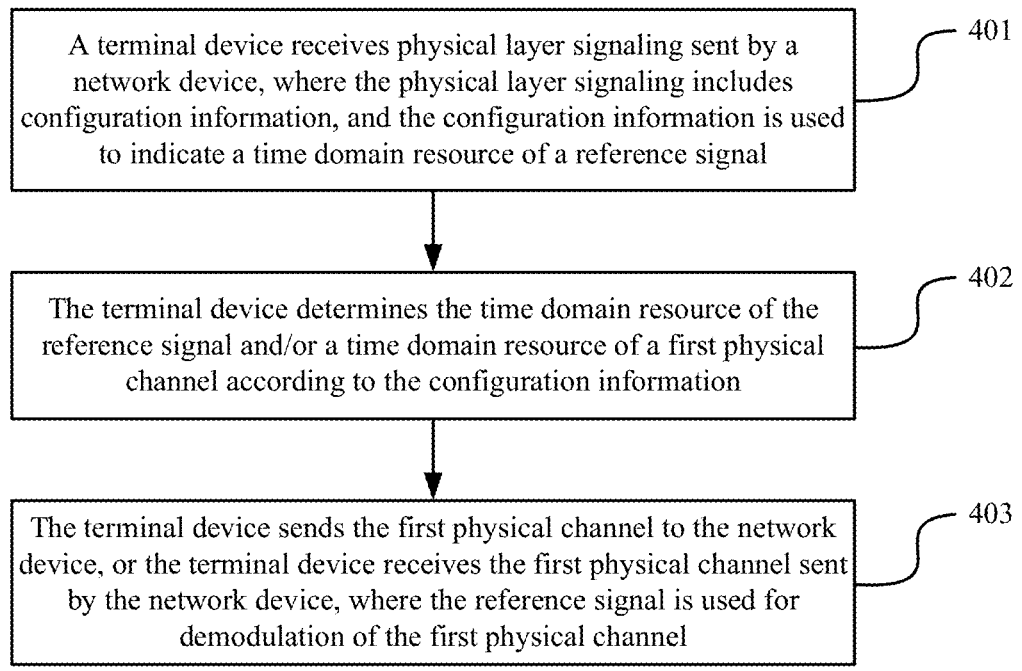
FIG. 4 is a flowchart of a reference signal transmission method according to an embodiment of the present invention.

During implementation, the network device may determine a time domain resource of a reference signal, and send the first physical layer signaling to the first terminal device (which may be any terminal device, that is, the terminal device described in the procedure shown in FIG. 4), where the first physical layer signaling includes the first configuration information, and the first configuration information is used to indicate the time domain resource of the first reference signal, that is, the first physical layer signaling includes information used to indicate the time domain resource of the first reference signal. For specific content of the first physical layer signaling, refer to the description of the physical layer signaling in step 401 to step 403. Details are not described herein again.

The first reference signal is used for demodulation of the first physical channel. Optionally, the first physical channel is an uplink physical channel, for example, a PUSCH. In this case, the network device demodulates the first physical channel according to the first reference signal. Optionally, the first physical channel is a downlink physical channel, for example, a PDSCH. In this case, the terminal device demodulates the first physical channel according to the first reference signal.

Optionally, the first physical layer signaling is the first DCI. The network device sends the first DCI to the first terminal device, where the first DCI includes the first configuration information, and the first configuration information is used to indicate the time domain resource of the first reference signal. For specific content of the first DCI, refer to the description of the DCI in step 401 to step 403. Details are not described herein again.

Optionally, the first physical layer signaling is multicast signaling, that is, the first physical layer signaling is sent to a group of terminal devices, or the first physical layer signaling is unicast signaling, that is, the first physical layer signaling is sent to one terminal device.

Optionally, in this embodiment of the present invention, a length of a TTI is less than 1 ms. For example, the length of the TTI is 0.5 ms, a length of one symbol, a length of two symbols, a length of three symbols, or a length of four symbols.

Optionally, the first configuration information is used to indicate one of N reference signal time domain configurations, where N is a positive integer, and any two of the N reference signal time domain configurations indicate different time domain resources occupied by the reference signal. That is, the first reference signal may occupy N different time domain resources.

Optionally, the N reference signal time domain configurations are predefined, that is, the network device may prestore the N reference signal time domain configurations; or optionally, the network device configures the N reference signal time domain configurations, and sends higher layer signaling to the first terminal device, where the higher layer signaling is used to indicate the N reference signal time domain configurations. Then, the network device selects one from the N reference signal time domain configurations, and sends the first physical layer signaling to the first terminal device, where the first physical layer signaling is used to indicate the selected reference signal time domain configuration.

Optionally, the first configuration information included in the first DCI sent by the network device may indicate one of N reference signal time domain configurations, where N is a positive integer. For specific content of the first configuration information, refer to the description of the configuration information in step 401 to step 403. Details are not described herein again.

During implementation, after determining the time domain resource of the first reference signal, the network device may send, to the first terminal device, the first physical layer signaling that includes the first configuration information. For example, when the first configuration information indicates that the first reference signal and the first physical channel are located in a same TTI, the first physical channel occupies all symbols in the TTI except a symbol occupied by the first reference signal; or when the first configuration information indicates that the first reference signal and the first physical channel are located in different TTIs, the first physical channel occupies all symbols in a TTI in which the first physical channel is located.

The following specifically describes several optional time domain resources that are of the reference signal and indicated by the configuration information for the time domain resource of the reference signal.

Optionally, the first configuration information indicates that the first reference signal and the first physical channel are located in a same transmission time interval TTI, or that the first reference signal is located in a $k^{th}$ TTI before the TTI in which the first physical channel is located, where k is a positive integer. For example, k is 1, 2, or 3. In other words, the first configuration information indicates that the first reference signal is located in a $k^{th}$ TTI before the TTI in which the first physical channel is located, where k is a nonnegative integer. For example, k is 0, 1, 2, or 3. Optionally, when the first configuration information indicates that k is 0, the first physical channel occupies some symbols in the TTI in which the first physical channel is located (the first reference signal does not occupy the some symbols); or when the first configuration information indicates that k is greater than 0, the first physical channel occupies all symbols in the TTI in which the first physical channel is located. For specific content of the first configuration information, refer to the solution 1 and the solution 2 in step 401 to step 403. Details are not described herein again.

Optionally, the first reference signal and the first physical channel are located in a same TTI, and the first configuration information is used to indicate that the first reference signal is located on a first symbol or a last symbol in the TTI. For specific content of the first configuration information, refer to the solution 3 in step 401 to step 403. Details are not described herein again.

Optionally, the first configuration information is used to indicate that the first reference signal is located on an $a^{th}$ symbol in a timeslot or a $b^{th}$ symbol in a subframe, where a is a positive integer that is not greater than 6 or 7, and b is a positive integer that is not greater than 12 or 14. For example, a is 1 or 4, and b is 1, 4, 8, or 11. For another example, a is 1 or 3, and b is 1, 3, 7, or 9. Preferably, the first reference signal and the first physical channel are located in a same timeslot or subframe. For specific content of the first configuration information, refer to the solution 4 and the solution 5 in step 401 to step 403. Details are not described herein again.

Optionally, the first configuration information is used to indicate that the first reference signal is located on c symbols in a timeslot or d symbols in a subframe, where c is a positive integer that is not greater than 6 or 7, and d is a positive integer that is not greater than 12 or 14. Preferably, the first reference signal and the first physical channel are located in a same timeslot or subframe. For example, c is 1 or 2, and the first configuration information is used to indicate that the reference signal is located on a first symbol in the timeslot or a first symbol and a fourth symbol in the timeslot. For example, d is 2 or 4, and the first configuration information is used to indicate that the reference signal is located on a first symbol and an eighth symbol in the subframe, or a first symbol, a fourth symbol, an eighth symbol, and an eleventh symbol in the subframe. For specific content of the first configuration information, refer to the solution 6 and the solution 7 in step 401 to step 403. Details are not described herein again.

Optionally, the first configuration information may be further used to indicate a frequency domain resource of the first reference signal. Optionally, the first configuration information may include one or more information fields. For specific content, refer to content in step 401 to step 403 in which the configuration information is further used to indicate the frequency domain resource of the reference signal. Details are not described herein again.

Optionally, the first configuration information may be further used to indicate that the first reference signal is located on a subcarrier whose number is even or a subcarrier whose number is odd. Optionally, the configuration information includes one or more information fields. For specific content, refer to the foregoing embodiments. Details are not described herein again.

Optionally, the first physical channel is an uplink physical channel (for example, a PUSCH or a PUCCH), and step 1202 includes: receiving, by the network device, the first reference signal and the first physical channel that are sent by the first terminal device, and demodulating the first physical channel according to the first reference signal, where the first reference signal is used for demodulation of the first physical channel. It should be noted that, there is no time sequence relationship between receiving of the first reference signal and receiving of the first physical channel. That is, the network device may first receive the first reference signal and then receive the first physical channel, or first receive the first physical channel and then receive the first reference signal.

Optionally, the first physical channel is a downlink physical channel (for example, a PDSCH), and step 1202 includes: sending, by the network device, the first reference signal and the first physical channel to the first terminal device, where the first reference signal is used for demodulation of the first physical channel. It should be noted that, there is no time sequence relationship between sending of the first reference signal and sending of the first physical channel.

Optionally, the first physical channel is an uplink physical channel (for example, a PUSCH or a PUCCH), and before or when the network device sends the first physical layer signaling to the first terminal device, the processing procedure further includes: receiving, by the network device, the first reference signal sent by the first terminal device. In this case, step 1202 includes: receiving, by the network device, the first physical channel sent by the first terminal device, and demodulating the first physical channel according to the first reference signal. It should be noted that, because the first reference signal may be located in the $k^{th}$ TTI (k is greater than 0) before the TTI in which the first physical channel is located, the first reference signal indicated by the first physical layer signaling sent by the network device may be a first reference signal that has been received or is being received by the network device. This corresponds to a case in which only the first physical channel is sent on a side of the first terminal device.

Optionally, the first physical channel is a downlink physical channel (for example, a PDSCH), and before or when the network device sends the first physical layer signaling to the first terminal device, the processing procedure further includes: sending, by the network device, the first reference signal to the first terminal device. In this case, step 1202 includes: sending, by the network device, the first physical channel to the first terminal device. It should be noted that, because the first reference signal may be located in the $k^{th}$ TTI (k is greater than 0) before the TTI in which the first physical channel is located, the first reference signal indicated by the first physical layer signaling sent by the network device to the first terminal device may be a first reference signal that has been sent or is being sent by the network device.

Optionally, the network device may further receive a second physical channel sent by the first terminal device. Correspondingly, a processing process may be as follows: the network device receives the second physical channel sent by the first terminal device, where the first physical channel and the second physical channel are located in different TTIs, and the network device demodulates the second physical channel according to the first reference signal.

Optionally, the network device may further send a second physical channel to the first terminal device. Correspondingly, a processing process may be as follows: the network device sends the second physical channel to the first terminal device, where the first reference signal is used for demodulation of the second physical channel, and the first physical channel and the second physical channel are located in different TTIs. In this case, the first physical channel and the second physical channel correspond to the same first reference signal, and the first reference signal has been sent to the first terminal device. Therefore, in this case, the network device may send only the second physical channel.

Based on the foregoing configuration manner of a time domain resource of a reference signal, for a same terminal device, even if the network device needs to configure that different physical channels are located in different TTIs, a same reference signal can be configured for the different physical channels. For example, as shown in FIG. 11, a first physical channel and a second physical channel that are scheduled to a same terminal device are located on different symbols, and a reference signal corresponding to the first physical channel and a reference signal corresponding to the second physical channel are a same reference signal, that is, the reference signals corresponding to the first physical channel and the second physical channel are located on a same time domain resource. In the prior art, each physical channel needs to correspond to at least one reference signal, that is, two different physical channels need at least two reference signals. Compared with the prior art, the configuration manner in the present disclosure can reduce reference signal overheads.

Optionally, the network device may further send second physical layer signaling to a second terminal device. Correspondingly, a processing process may be as follows: the network device sends the second physical layer signaling to the second terminal device, where the second physical layer signaling includes second configuration information, and the second configuration information is used to indicate a time domain resource of a second reference signal; and the network device receives a third physical channel sent by the second terminal device, and demodulates the third physical channel according to the second reference signal, or the network device sends a third physical channel to the second terminal device, where the second reference signal is used for demodulation of the third physical channel, the second reference signal and the first reference signal are located on a same time domain resource, and the first physical channel and the third physical channel are located in different TTIs.

The second terminal device may be any terminal device other than the first terminal device.

During implementation, the network device may send the second physical layer signaling to the second terminal device, where the second physical layer signaling may include the second configuration information, and the second configuration information may be used to indicate the time domain resource of the second reference signal. The second terminal device may determine the time domain resource of the second reference signal according to the method described in step 401 to step 403, and send the second reference signal and the third physical channel to the network device, or receive the second reference signal and the third physical channel that are sent by the network device. The third physical channel may be a physical channel scheduled by the second physical layer signaling, and is a physical channel corresponding to the second reference signal. The network device may receive the second reference signal and the third physical channel that are sent by the second terminal device, or may send the second reference signal and the third physical channel to the second terminal device. The second reference signal and the first reference signal may be located on the same time domain resource, and located on different frequency domain resources or code domain resources, and the first physical channel and the third physical channel are located in different TTIs.

Figure 13:
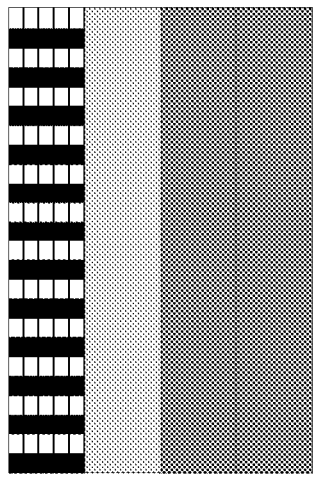
FIG. 13 is a schematic diagram of a reference signal time domain configuration according to an embodiment of the present invention.

Based on the foregoing configuration manner of a time domain resource of a reference signal, for different terminal devices, even if the network device needs to configure that physical channels of the different terminal devices are located in different TTIs, it can be configured that reference signals corresponding to the physical channels of the different terminal devices are located on a same time domain resource. For example, as shown in FIG. 13, the first physical channel scheduled to the first terminal device and the second physical channel scheduled to the second terminal device are located on different symbols, and the first reference signal corresponding to the first physical channel and the second reference signal corresponding to the second physical channel are located on a same symbol. Further, the first reference signal and the second reference signal may be located on different frequency domain resources. For example, the first reference signal may be located on a subcarrier whose number is even, and the second reference signal may be located on a subcarrier whose number is odd. Alternatively, the first reference signal and the second reference signal may be located on different code domain resources. In the prior art, physical channels located on different time domain resources need to correspond to different reference signals, that is, physical channels located on two time domain resources need at least two reference signals. Compared with the prior art, the configuration manner in the present disclosure can reduce reference signal overheads.

Optionally, for a case in which the physical layer signaling is DCI, the second physical layer signaling may be second DCI.

Optionally, the second physical layer signaling is multicast signaling, that is, the second physical layer signaling is sent to a group of terminal devices, or the second physical layer signaling is unicast signaling, that is, the second physical layer signaling is sent to one terminal device.

Optionally, a first physical layer signaling and the second physical layer signaling are same physical layer signaling.

Optionally, the first DCI and the second DCI are same DCI. The DCI includes a plurality of pieces of configuration information, and different pieces of configuration information indicate time domain resources and/or frequency domain resources of reference signals of different terminal devices. For example, two of the plurality of pieces of configuration information are first configuration information and second configuration information.

In this embodiment of the present invention, the network device sends the first physical layer signaling to the first terminal device, where the first physical layer signaling includes configuration information used to indicate the time domain resource of the first reference signal; and then the first terminal device may determine the time domain resource of the first reference signal and/or a time domain resource of the first physical channel according to the configuration information. Therefore, the network device can dynamically configure the time domain resource of the reference signal, so as to improve flexibility of reference signal configuration. For example, to reduce reference signal overheads, and increase a system capacity, the network device may configure, particularly when a length of the TTI is less than 1 ms, that one reference signal is used for demodulation of a plurality of physical channels. For example, when channel estimation performance is poor, and reference signal overheads need to be increased, the network device may configure, in one timeslot, that a reference signal occupies a time domain resource of at least two symbols.

Figure 14:
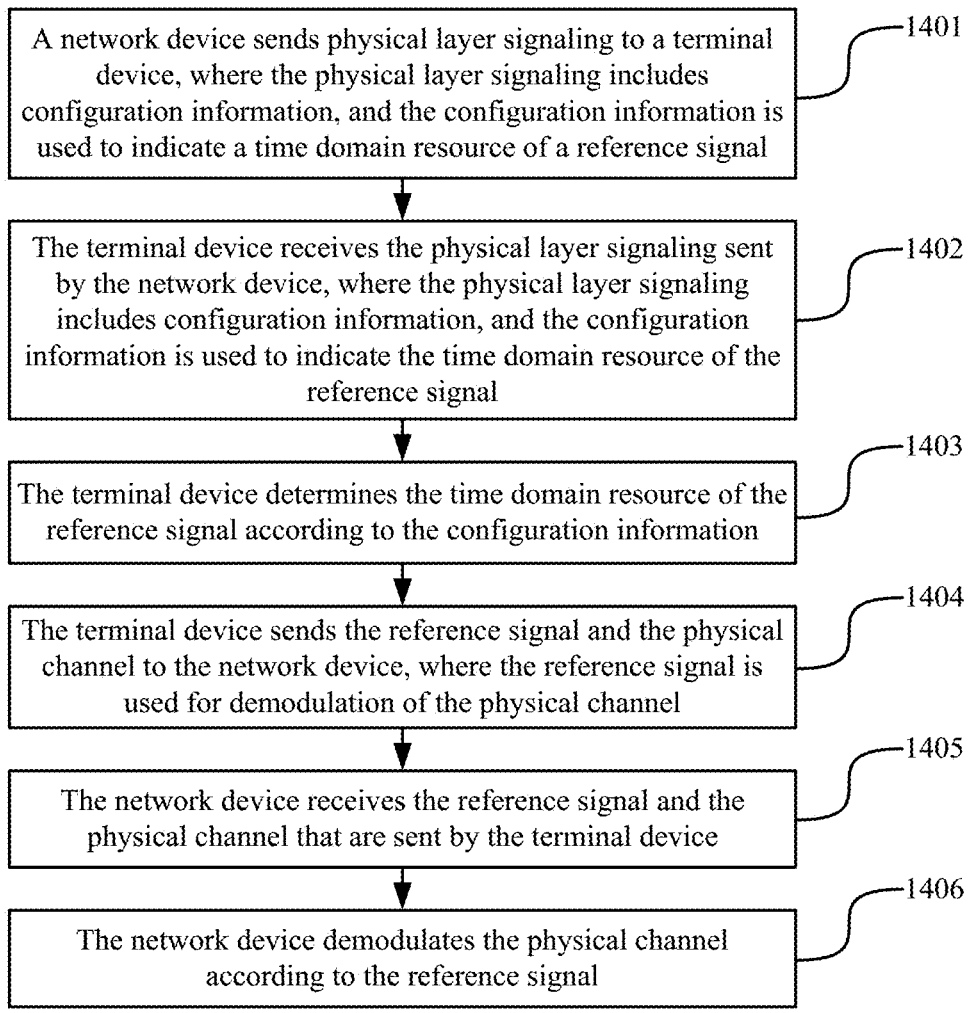
FIG. 14 is a flowchart of a reference signal transmission method according to an embodiment of the present invention.

The following describes, by using an example in which execution bodies are a network device and a terminal device, a processing procedure, shown in FIG. 14, of the system in detail with reference to specific implementations, and content of the processing procedure may be as follows:

Step 1401: The network device sends physical layer signaling to the terminal device, where the physical layer signaling includes configuration information, and the configuration information is used to indicate a time domain resource of a reference signal.

The physical layer signaling may be DCI.

During implementation, the network device may determine the time domain resource of the reference signal, and send the physical layer signaling to the terminal device (which may be any terminal device, that is, the terminal device described in the procedure shown in FIG. 4), where the physical layer signaling includes the configuration information, and the configuration information is used to indicate the time domain resource of the reference signal, that is, the physical layer signaling includes information used to indicate the time domain resource of the reference signal. For specific content of the physical layer signaling, refer to the description of the physical layer signaling in step 401 to step 403. Details are not described herein again.

Step 1402: The terminal device receives the physical layer signaling sent by the network device, where the physical layer signaling includes configuration information, and the configuration information is used to indicate the time domain resource of the reference signal.

During implementation, after the network device sends the physical layer signaling to the terminal device, the terminal device may receive the physical layer signaling sent by the network device, where the physical layer signaling includes the configuration information, and the configuration information is used to indicate a time domain resource of a reference signal corresponding to a physical channel scheduled by the physical layer signaling.

Step 1403: The terminal device determines the time domain resource of the reference signal according to the configuration information.

During implementation, after receiving the physical layer signaling sent by the network device, the terminal device may determine the time domain resource of the reference signal according to the configuration information included in the physical layer signaling. Specifically, N predefined reference signal time domain configurations of the reference signal may be prestored in the terminal device; and after receiving the physical layer signaling sent by the network device, the terminal device may determine the time domain resource of the reference signal according to a configuration manner indicated by the configuration information included in the physical layer signaling.

Step 1404: The terminal device sends the reference signal and a physical channel to the network device, where the reference signal is used for demodulation of the physical channel.

During implementation, after determining the time domain resource of the reference signal, the terminal device may send the reference signal and the physical channel to the network device, where the reference signal is used for demodulation of the physical channel, that is, the reference signal is the reference signal corresponding to the physical channel scheduled by the physical layer signaling.

Step 1405: The network device receives the reference signal and the physical channel that are sent by the terminal device.

During implementation, after the terminal device sends the reference signal and the physical channel to the network device, the network device may receive the reference signal and the physical channel that are sent by the terminal device.

Step 1406: The network device demodulates the physical channel according to the reference signal.

During implementation, after receiving the reference signal and the physical channel that are sent by the terminal device, the network device may demodulate the physical channel according to the reference signal corresponding to the physical channel.

In this embodiment of the present invention, the network device sends the first physical layer signaling to the first terminal device, where the first physical layer signaling includes configuration information used to indicate the time domain resource of the first reference signal; and then the first terminal device may determine the time domain resource of the first reference signal and/or a time domain resource of the first physical channel according to the configuration information. Therefore, the network device can dynamically configure the time domain resource of the reference signal, so as to improve flexibility of reference signal configuration. For example, to reduce reference signal overheads, and increase a system capacity, the network device may configure, particularly when a length of the TTI is less than 1 ms, that one reference signal is used for demodulation of a plurality of physical channels. For example, when channel estimation performance is poor, and reference signal overheads need to be increased, the network device may configure, in one timeslot, that a reference signal occupies a time domain resource of at least two symbols.

Based on a same conception, an embodiment of the present invention further provides a terminal device. As shown in FIG. 2, the terminal device provided in this embodiment may implement the procedures in the embodiments shown in FIG. 4 and FIG. 14 of the present disclosure, and the terminal device includes a receiver 210, a processor 220, and a transmitter 230.

The receiver 210 is configured to receive physical layer signaling sent by a network device, where the physical layer signaling includes configuration information, and the configuration information is used to indicate a time domain resource of a reference signal.

The processor 220 is configured to determine the time domain resource of the reference signal according to the configuration information received by the receiver 210.

The transmitter 230 is configured to send the reference signal determined by the processor 220 and a first physical channel to the network device, where the reference signal is used for demodulation of the first physical channel.

During implementation, after the network device sends the physical layer signaling to the terminal device, the receiver 210 may receive the physical layer signaling sent by the network device, where the physical layer signaling includes the configuration information, and the configuration information is used to indicate a time domain resource of a reference signal corresponding to a physical channel scheduled by the physical layer signaling. After the receiver 210 receives the physical layer signaling sent by the network device, the processor 220 may determine the time domain resource of the reference signal according to the configuration information included in the physical layer signaling. Specifically, N predefined reference signal time domain configurations of the reference signal may be prestored in the terminal device; and after the receiver 210 receives the physical layer signaling sent by the network device, the processor 220 may determine the time domain resource of the reference signal according to a configuration manner indicated by the configuration information included in the physical layer signaling. Then, the transmitter 230 may send the reference signal and the first physical channel to the network device, where the reference signal is used for demodulation of the first physical channel.

Optionally, the configuration information is used to indicate one of N reference signal time domain configurations, where N is a positive integer, and any two of the N reference signal time domain configurations indicate different time domain resources occupied by the reference signal.

Optionally, the configuration information indicates that the reference signal and the first physical channel are located in a same transmission time interval TTI, or that the reference signal is located in a $k^{th}$ TTI before a TTI in which the first physical channel is located, where k is a positive integer.

During implementation, the terminal device determines, according to the configuration information, that the reference signal and the first physical channel are located in the same TTI, or that the reference signal is located in the $k^{th}$ TTI before the TTI in which the first physical channel is located, where k is a positive integer. For example, k is 1, 2, or 3. In other words, the terminal device determines, according to the configuration information for the time domain resource of the reference signal, that the reference signal is located in a $k^{th}$ TTI before the TTI in which the first physical channel is located, where k is a nonnegative integer. For example, k is 0, 1, 2, or 3. Optionally, when the configuration information indicates that k is 0, the terminal device determines that the first physical channel occupies some symbols in the TTI in which the first physical channel is located (the reference signal does not occupy the some symbols); or when the configuration information indicates that k is greater than 0, the terminal device determines that the first physical channel occupies all symbols in the TTI in which the first physical channel is located. For specific content of the configuration information, refer to the solution 1 and the solution 2 in step 401 to step 403. Details are not described herein again.

Optionally, the reference signal and the first physical channel are located in a same TTI, and the configuration information is used to indicate that the reference signal is located on a first symbol or a last symbol in the TTI.

During implementation, the terminal device determines, according to the configuration information, that the reference signal and the first physical channel are located in the same TTI, and that the reference signal is located on the first symbol or the last symbol in the TTI. That is, the reference signal is located on a symbol before the first physical channel, or the reference signal is located on a symbol after the first physical channel.

Optionally, the terminal device determines, according to the configuration information, that the first physical channel does not occupy the first symbol or the last symbol in the TTI. For specific content of the configuration information, refer to the solution 3 in step 401 to step 403. Details are not described herein again.

Optionally, the reference signal and the first physical channel are located in a same timeslot or subframe, and the configuration information is used to indicate that the reference signal is located on an $a^{th}$ symbol in the timeslot or a $b^{th}$ symbol in the subframe, where a is 1 or 4, and b is 1, 4, 8, or 11.

During implementation, the terminal device determines, according to the configuration information, that the reference signal is located on an $a^{th}$ symbol in a timeslot or a $b^{th}$ symbol in a subframe, where the timeslot or subframe is a timeslot or subframe in which the first physical channel is located. For example, the configuration information may be used to indicate that the reference signal is located on a first symbol or a fourth symbol in the timeslot in which the first physical channel is located. For example, the configuration information may be used to indicate that the reference signal is located on a first symbol, a fourth symbol, an eighth symbol, or an eleventh symbol in the subframe in which the first physical channel is located. Optionally, the terminal device determines, according to the configuration information, that the first physical channel does not occupy the $a^{th}$ symbol in the timeslot or the $b^{th}$ symbol in the subframe. For specific content of the configuration information, refer to the solution 4 and the solution 5 in step 401 to step 403. Details are not described herein again.

Optionally, the reference signal and the first physical channel are located in a same timeslot, and the configuration information is used to indicate that the reference signal is located on a first symbol in the timeslot or a first symbol and a fourth symbol in the timeslot.

During implementation, the terminal device determines, according to the configuration information, that the reference signal is located on c symbols in the timeslot or d symbols in the subframe, where the timeslot or subframe is a timeslot or subframe in which the first physical channel is located. Optionally, the terminal device determines, according to the configuration information, that the first physical channel does not occupy the c symbols in the timeslot or the d symbols in the subframe. For specific content of the configuration information, refer to the solution 6 or the solution 7 in step 401 to step 403. Details are not described herein again.

Optionally, the transmitter 230 is further configured to:

send a second physical channel to the network device, where the reference signal is used for demodulation of the second physical channel, and the first physical channel and the second physical channel are located in different TTIs.

During implementation, the transmitter 230 may further send the second physical channel to the network device, where the first physical channel and the second physical channel are located in different TTIs, and correspond to the same reference signal, that is, the reference signal may be used for demodulation of the first physical channel, and may also be used for demodulation of the second physical channel.

Optionally, the configuration information is further used to indicate that the reference signal is located on a subcarrier whose number is even or a subcarrier whose number is odd.

The processor 220 is specifically configured to:

determine the time domain resource of the reference signal according to the configuration information, and determine, according to the configuration information, that the reference signal is located on the subcarrier whose number is even or the subcarrier whose number is odd.

During implementation, the configuration information is further used to indicate a frequency domain resource of the reference signal. Specifically, the configuration information may be used to indicate that the reference signal is located on the subcarrier whose number is even or the subcarrier whose number is odd. In this case, the processor 220 may be configured to: determine the time domain resource of the reference signal according to the configuration information, and determine, according to the configuration information, that the reference signal is located on the subcarrier whose number is even or the subcarrier whose number is odd.

Optionally, the physical layer signaling is downlink control information DCI, and the DCI is multicast signaling, or the DCI is unicast signaling.

Based on a same conception, an embodiment of the present invention further provides a network device. As shown in FIG. 3, the network device provided in this embodiment may implement the procedures in the embodiments shown in FIG. 12 and FIG. 14 of the present disclosure, and the network device includes a transmitter 310, a receiver 320, and a processor 330.

The transmitter 310 is configured to send first physical layer signaling to a first terminal device, where the first physical layer signaling includes first configuration information, and the first configuration information is used to indicate a time domain resource of a first reference signal.

The receiver 320 is configured to receive the first reference signal and a first physical channel that are sent by the first terminal device.

The processor 330 is configured to demodulate the first physical channel according to the first reference signal received by the receiver 320.

The physical layer signaling may be DCI.

During implementation, the processor 330 may determine a time domain resource of a reference signal; and the transmitter 310 may send the first physical layer signaling to the first terminal device (which may be any terminal device, that is, the terminal device described in the procedure shown in FIG. 4), where the first physical layer signaling includes first configuration information, and the first configuration information is used to indicate the time domain resource of the first reference signal, that is, the first physical layer signaling includes information used to indicate the time domain resource of the first reference signal. After receiving the physical layer signaling sent by the transmitter 310, the first terminal device may perform processing according to the foregoing manner in step 401 to step 403. When the first terminal device sends the first reference signal and the first physical channel to the network device, the receiver 320 may receive the first reference signal and the first physical channel that are sent by the first terminal device. The processor 330 may demodulate the first physical channel according to the first reference signal received by the receiver 320.

Optionally, the first configuration information is used to indicate one of N reference signal time domain configurations, where N is a positive integer, and any two of the N reference signal time domain configurations indicate different time domain resources occupied by the reference signal.

Optionally, the first configuration information indicates that the first reference signal and the first physical channel are located in a same transmission time interval TTI, or that the first reference signal is located in a $k^{th}$ TTI before a TTI in which the first physical channel is located, where k is a positive integer.

During implementation, the first configuration information indicates that the first reference signal and the first physical channel are located in the same transmission time interval TTI, or that the first reference signal is located in the $k^{th}$ TTI before the TTI in which the first physical channel is located, where k is a positive integer. For example, k is 1, 2, or 3. In other words, the first configuration information indicates that the first reference signal is located in a $k^{th}$ TTI before the TTI in which the first physical channel is located, where k is a nonnegative integer. For example, k is 0, 1, 2, or 3. Optionally, when the first configuration information indicates that k is 0, the first physical channel occupies some symbols in the TTI in which the first physical channel is located (the first reference signal does not occupy the some symbols); or when the first configuration information indicates that k is greater than 0, the first physical channel occupies all symbols in the TTI in which the first physical channel is located. For specific content of the first configuration information, refer to the solution 1 and the solution 2 in step 401 to step 403. Details are not described herein again.

Optionally, the first reference signal and the first physical channel are located in a same TTI, and the first configuration information is used to indicate that the first reference signal is located on a first symbol or a last symbol in the TTI.

During implementation, the first information reference signal and the first physical channel are located in the same TTI, and the first reference signal is located on the first symbol or the last symbol in the TTI. That is, the first reference signal is located on a symbol before the first physical channel, or the first reference signal is located on a symbol after the first physical channel. Optionally, the first configuration information may be used to indicate that the first physical channel does not occupy the first symbol or the last symbol in the TTI. For specific content of the first configuration information, refer to the solution 3 in step 401 to step 403. Details are not described herein again.

Optionally, the first reference signal and the first physical channel are located in a same timeslot or subframe, and the first configuration information is used to indicate that the first reference signal is located on an $a^{th}$ symbol in the timeslot or a $b^{th}$ symbol in the subframe, where a is 1 or 4, and b is 1, 4, 8, or 11.

During implementation, the first configuration information is used to indicate that the first reference signal is located on an $a^{th}$ symbol in a timeslot or a $b^{th}$ symbol in a subframe, where the timeslot or subframe is a timeslot or subframe in which the first physical channel is located. For example, the first configuration information may be used to indicate that the first reference signal is located on a first symbol or a fourth symbol in the timeslot in which the first physical channel is located. For example, the first configuration information may be used to indicate that the first reference signal is located on a first symbol, a fourth symbol, an eighth symbol, or an eleventh symbol in the subframe in which the first physical channel is located. Optionally, the first configuration information may be used to indicate that the first physical channel does not occupy the $a^{th}$ symbol in the timeslot or the $b^{th}$ symbol in the subframe. For specific content of the configuration information, refer to the solution 4 and the solution 5 in step 401 to step 403. Details are not described herein again.

Optionally, the first reference signal and the first physical channel are located in a same timeslot, and the first configuration information is used to indicate that the first reference signal is located on a first symbol in the timeslot or a first symbol and a fourth symbol in the timeslot. For specific content of the configuration information, refer to the solution 6 or the solution 7 in step 401 to step 403. Details are not described herein again.

Optionally, the receiver 320 is further configured to:

receive a second physical channel sent by the first terminal device, where the first physical channel and the second physical channel are located in different TTIs.

The processor 330 is further configured to:

demodulate the second physical channel according to the first reference signal.

During implementation, for a case in which the first terminal device sends the second physical channel, the receiver 320 may further receive the second physical channel sent by the first terminal device, where the first physical channel and the second physical channel are located in different TTIs. Then, the processor 330 may demodulate the second physical channel according to the first reference signal.

Optionally, the first configuration information is further used to indicate that the first reference signal is located on a subcarrier whose number is even or a subcarrier whose number is odd.

Optionally, the transmitter 310 is further configured to:

send second physical layer signaling to a second terminal device, where the second physical layer signaling includes second configuration information, and the second configuration information is used to indicate a time domain resource of a second reference signal.

The receiver 320 is further configured to:

receive the second reference signal and a third physical channel that are sent by the second terminal device, where the second reference signal and the first reference signal are located on a same time domain resource, and the first physical channel and the third physical channel are located in different TTIs.

The processor 330 is further configured to:

demodulate the third physical channel according to the second reference signal.

The second terminal device may be any terminal device other than the first terminal device.

During implementation, the transmitter 310 may send the second physical layer signaling to the second terminal device, where the second physical layer signaling may include the second configuration information, and the second configuration information may be used to indicate the time domain resource of the second reference signal. The second terminal device may determine the time domain resource of the second reference signal according to the method described in step 401 to step 403, and send the second reference signal and the third physical channel to the network device. The third physical channel may be a physical channel scheduled by the second physical layer signaling, and is a physical channel corresponding to the second reference signal. The receiver 320 may receive the second reference signal and the third physical channel that are sent by the second terminal device, where the second reference signal and the first reference signal may be located on the same time domain resource, and located on different frequency domain resources or code domain resources, and the first physical channel and the third physical channel are located in different TTIs. Then, the processor 330 may demodulate the third physical channel according to the second reference signal.

Optionally, the first physical layer signaling is first DCI, the second physical layer signaling is second DCI, and the first DCI or the second DCI or both are unicast signaling, or the first DCI and the second DCI are same DCI and are multicast signaling.

In this embodiment of the present invention, the network device sends the first physical layer signaling to the first terminal device, where the first physical layer signaling includes configuration information used to indicate the time domain resource of the first reference signal; and then the first terminal device may determine the time domain resource of the first reference signal and/or a time domain resource of the first physical channel according to the configuration information. Therefore, the network device can dynamically configure the time domain resource of the reference signal, so as to improve flexibility of reference signal configuration. For example, to reduce reference signal overheads, and increase a system capacity, the network device may configure, particularly when a length of the TTI is less than 1 ms, that one reference signal is used for demodulation of a plurality of physical channels. For example, when channel estimation performance is poor, and reference signal overheads need to be increased, the network device may configure, in one timeslot, that a reference signal occupies a time domain resource of at least two symbols.

Figure 15:
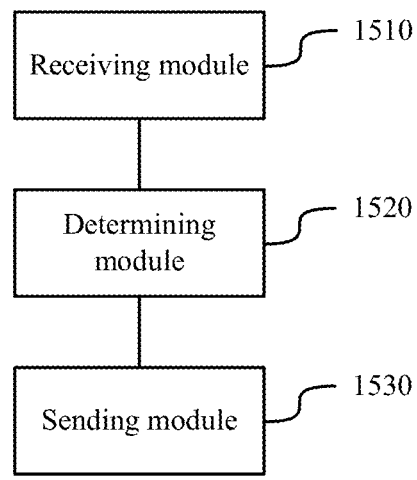
FIG. 15 is a schematic structural diagram of a terminal device according to an embodiment of the present invention.

Based on a same technical conception, an embodiment of the present invention further provides a terminal device. As shown in FIG. 15, the terminal device includes:

a receiving module 1510, configured to receive physical layer signaling sent by a network device, where the physical layer signaling includes configuration information, and the configuration information is used to indicate a time domain resource of a reference signal;

a determining module 1520, configured to determine the time domain resource of the reference signal according to the configuration information received by the receiving module 1510; and a sending module 1530, configured to send the reference signal determined by the determining module 1520 and a first physical channel to the network device, where the reference signal is used for demodulation of the first physical channel.

During implementation, after the network device sends the physical layer signaling to the terminal device, the receiving module 1510 may receive the physical layer signaling sent by the network device, where the physical layer signaling includes configuration information, and the configuration information is used to indicate a time domain resource of a reference signal corresponding to a physical channel scheduled by the physical layer signaling. After the receiving module 1510 receives the physical layer signaling sent by the network device, the determining module 1520 may determine the time domain resource of the reference signal according to the configuration information included in the physical layer signaling. Specifically, N predefined reference signal time domain configurations of the reference signal may be prestored in the terminal device; and after the receiving module 1510 receives the physical layer signaling sent by the network device, the determining module 1520 may determine the time domain resource of the reference signal according to a configuration manner indicated by the configuration information included in the physical layer signaling. Then, the sending module 1530 may send the reference signal and the first physical channel to the network device, where the reference signal is used for demodulation of the first physical channel.

Optionally, the configuration information is used to indicate one of N reference signal time domain configurations, where N is a positive integer, and any two of the N reference signal time domain configurations indicate different time domain resources occupied by the reference signal.

Optionally, the configuration information indicates that the reference signal and the first physical channel are located in a same transmission time interval TTI, or that the reference signal is located in a $k^{th}$ TTI before a TTI in which the first physical channel is located, where k is a positive integer.

During implementation, the terminal device determines, according to the configuration information, that the reference signal and the first physical channel are located in the same TTI, or that the reference signal is located in the $k^{th}$ TTI before the TTI in which the first physical channel is located, where k is a positive integer. For example, k is 1, 2, or 3. In other words, the terminal device determines, according to the configuration information for the time domain resource of the reference signal, that the reference signal is located in a $k^{th}$ TTI before the TTI in which the first physical channel is located, where k is a nonnegative integer. For example, k is 0, 1, 2, or 3. Optionally, when the configuration information indicates that k is 0, the terminal device determines that the first physical channel occupies some symbols in the TTI in which the first physical channel is located (the reference signal does not occupy the some symbols); or when the configuration information indicates that k is greater than 0, the terminal device determines that the first physical channel occupies all symbols in the TTI in which the first physical channel is located. For specific content of the configuration information, refer to the solution 1 and the solution 2 in step 401 to step 403. Details are not described herein again.

Optionally, the reference signal and the first physical channel are located in a same TTI, and the configuration information is used to indicate that the reference signal is located on a first symbol or a last symbol in the TTI.

During implementation, the terminal device determines, according to the configuration information, that the reference signal and the first physical channel are located in the same TTI, and that the reference signal is located on the first symbol or the last symbol in the TTI. That is, the reference signal is located on a symbol before the first physical channel, or the reference signal is located on a symbol after the first physical channel. Optionally, the terminal device determines, according to the configuration information, that the first physical channel does not occupy the first symbol or the last symbol in the TTI. For specific content of the configuration information, refer to the solution 3 in step 401 to step 403. Details are not described herein again.

Optionally, the reference signal and the first physical channel are located in a same timeslot or subframe, and the configuration information is used to indicate that the reference signal is located on an at symbol in the timeslot or a $b^{th}$ symbol in the subframe, where a is 1 or 4, and b is 1, 4, 8, or 11.

During implementation, the terminal device determines, according to the configuration information, that the reference signal is located on an $a^{th}$ symbol in a timeslot or a $b^{th}$ symbol in a subframe, where the timeslot or subframe is a timeslot or subframe in which the first physical channel is located. For example, the configuration information may be used to indicate that the reference signal is located on a first symbol or a fourth symbol in the timeslot in which the first physical channel is located. For example, the configuration information may be used to indicate that the reference signal is located on a first symbol, a fourth symbol, an eighth symbol, or an eleventh symbol in the subframe in which the first physical channel is located. Optionally, the terminal device determines, according to the configuration information, that the first physical channel does not occupy the $a^{th}$ symbol in the timeslot or the $b^{th}$ symbol in the subframe. For specific content of the configuration information, refer to the solution 4 and the solution 5 in step 401 to step 403. Details are not described herein again.

Optionally, the reference signal and the first physical channel are located in a same timeslot, and the configuration information is used to indicate that the reference signal is located on a first symbol in the timeslot or a first symbol and a fourth symbol in the timeslot.

During implementation, the terminal device determines, according to the configuration information, that the reference signal is located on c symbols in the timeslot or d symbols in the subframe, where the timeslot or subframe is a timeslot or subframe in which the first physical channel is located. Optionally, the terminal device determines, according to the configuration information, that the first physical channel does not occupy the c symbols in the timeslot or the d symbols in the subframe. For specific content of the configuration information, refer to the solution 6 or the solution 7 in step 401 to step 403. Details are not described herein again.

Optionally, the sending module 1530 is further configured to:

send a second physical channel to the network device, where the reference signal is used for demodulation of the second physical channel, and the first physical channel and the second physical channel are located in different TTIs.

During implementation, the sending module 1530 may further send the second physical channel to the network device, where the first physical channel and the second physical channel are located in different TTIs, and correspond to the same reference signal, that is, the reference signal may be used for demodulation of the first physical channel, and may also be used for demodulation of the second physical channel.

Optionally, the configuration information is further used to indicate that the reference signal is located on a subcarrier whose number is even or a subcarrier whose number is odd.

The determining module 1520 is specifically configured to:

determine the time domain resource of the reference signal according to the configuration information, and determine, according to the configuration information, that the reference signal is located on the subcarrier whose number is even or the subcarrier whose number is odd.

During implementation, the configuration information is further used to indicate a frequency domain resource of the reference signal. Specifically, the configuration information may be used to indicate that the reference signal is located on the subcarrier whose number is even or the subcarrier whose number is odd. In this case, the determining module 1520 may be configured to: determine the time domain resource of the reference signal according to the configuration information, and determine, according to the configuration information, that the reference signal is located on the subcarrier whose number is even or the subcarrier whose number is odd.

Optionally, the physical layer signaling is downlink control information DCI, and the DCI is multicast signaling, or the DCI is unicast signaling.

Figure 16:
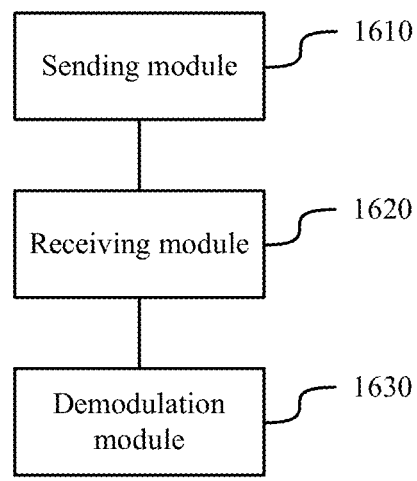
FIG. 16 is a schematic structural diagram of a network device according to an embodiment of the present invention.

Based on a same technical conception, an embodiment of the present invention further provides a network device. As shown in FIG. 16, the network device includes:

a sending module 1610, configured to send first physical layer signaling to a first terminal device, where the first physical layer signaling includes first configuration information, and the first configuration information is used to indicate a time domain resource of a first reference signal;

a receiving module 1620, configured to receive the first reference signal and a first physical channel that are sent by the first terminal device; and a demodulation module 1630, configured to demodulate the first physical channel according to the first reference signal received by the receiving module 1620.

The physical layer signaling may be DCI.

During implementation, the demodulation module 1630 may determine a time domain resource of a reference signal; and the sending module 1610 may send the first physical layer signaling to the first terminal device (which may be any terminal device, that is, the terminal device described in the procedure shown in FIG. 4), where the first physical layer signaling includes first configuration information, and the first configuration information is used to indicate the time domain resource of the first reference signal, that is, the first physical layer signaling includes information used to indicate the time domain resource of the first reference signal. After receiving the physical layer signaling sent by the sending module 1610, the first terminal device may perform processing according to the foregoing manner in step 401 to step 403. When the first terminal device sends the first reference signal and the first physical channel to the network device, the receiving module 1620 may receive the first reference signal and the first physical channel that are sent by the first terminal device. The demodulation module 1630 may demodulate the first physical channel according to the first reference signal received by the receiving module 1620.

Optionally, the first configuration information is used to indicate one of N reference signal time domain configurations, where N is a positive integer, and any two of the N reference signal time domain configurations indicate different time domain resources occupied by the reference signal.

Optionally, the first configuration information indicates that the first reference signal and the first physical channel are located in a same transmission time interval TTI, or that the first reference signal is located in a $k^{th}$ TTI before a TTI in which the first physical channel is located, where k is a positive integer.

During implementation, the first configuration information indicates that the first reference signal and the first physical channel are located in the same transmission time interval TTI, or that the first reference signal is located in the $k^{th}$ TTI before the TTI in which the first physical channel is located, where k is a positive integer. For example, k is 1, 2, or 3. In other words, the first configuration information indicates that the first reference signal is located in a $k^{th}$ TTI before the TTI in which the first physical channel is located, where k is a nonnegative integer. For example, k is 0, 1, 2, or 3. Optionally, when the first configuration information indicates that k is 0, the first physical channel occupies some symbols in the TTI in which the first physical channel is located (the first reference signal does not occupy the some symbols); or when the first configuration information indicates that k is greater than 0, the first physical channel occupies all symbols in the TTI in which the first physical channel is located. For specific content of the first configuration information, refer to the solution 1 and the solution 2 in step 401 to step 403. Details are not described herein again.

Optionally, the first reference signal and the first physical channel are located in a same TTI, and the first configuration information is used to indicate that the first reference signal is located on a first symbol or a last symbol in the TTI.

During implementation, the first information reference signal and the first physical channel are located in the same TTI, and the first reference signal is located on the first symbol or the last symbol in the TTI. That is, the first reference signal is located on a symbol before the first physical channel, or the first reference signal is located on a symbol after the first physical channel. Optionally, the first configuration information may be used to indicate that the first physical channel does not occupy the first symbol or the last symbol in the TTI. For specific content of the first configuration information, refer to the solution 3 in step 401 to step 403. Details are not described herein again.

Optionally, the first reference signal and the first physical channel are located in a same timeslot or subframe, and the first configuration information is used to indicate that the first reference signal is located on an $a^{th}$ symbol in the timeslot or a $b^{th}$ symbol in the subframe, where a is 1 or 4, and b is 1, 4, 8, or 11.

During implementation, the first configuration information is used to indicate that the first reference signal is located on an $a^{th}$ symbol in a timeslot or a $b^{th}$ symbol in a subframe, where the timeslot or subframe is a timeslot or subframe in which the first physical channel is located. For example, the first configuration information may be used to indicate that the first reference signal is located on a first symbol or a fourth symbol in the timeslot in which the first physical channel is located. For example, the first configuration information may be used to indicate that the first reference signal is located on a first symbol, a fourth symbol, an eighth symbol, or an eleventh symbol in the subframe in which the first physical channel is located. Optionally, the first configuration information may be used to indicate that the first physical channel does not occupy the $a^{th}$ symbol in the timeslot or the $b^{th}$ symbol in the subframe. For specific content of the configuration information, refer to the solution 4 and the solution 5 in step 401 to step 403. Details are not described herein again.

Optionally, the first reference signal and the first physical channel are located in a same timeslot, and the first configuration information is used to indicate that the first reference signal is located on a first symbol in the timeslot or a first symbol and a fourth symbol in the timeslot. For specific content of the configuration information, refer to the solution 6 or the solution 7 in step 401 to step 403. Details are not described herein again.

Optionally, the receiving module 1620 is further configured to:

receive a second physical channel sent by the first terminal device, where the first physical channel and the second physical channel are located in different TTIs.

The demodulation module 1630 is further configured to:

demodulate the second physical channel according to the first reference signal.

During implementation, for a case in which the first terminal device sends the second physical channel, the receiving module 1620 may further receive the second physical channel sent by the first terminal device, where the first physical channel and the second physical channel are located in different TTIs. Then, the demodulation module 1630 may demodulate the second physical channel according to the first reference signal.

Optionally, the first configuration information is further used to indicate that the first reference signal is located on a subcarrier whose number is even or a subcarrier whose number is odd.

Optionally, the sending module 1610 is further configured to:

send second physical layer signaling to a second terminal device, where the second physical layer signaling includes second configuration information, and the second configuration information is used to indicate a time domain resource of a second reference signal.

The receiving module 1620 is further configured to:

receive the second reference signal and a third physical channel that are sent by the second terminal device, where the second reference signal and the first reference signal are located on a same time domain resource, and the first physical channel and the third physical channel are located in different TTIs.

The demodulation module 1630 is further configured to:

demodulate the third physical channel according to the second reference signal.

The second terminal device may be any terminal device other than the first terminal device.

During implementation, the sending module 1610 may send the second physical layer signaling to the second terminal device, where the second physical layer signaling may include second configuration information, and the second configuration information may be used to indicate the time domain resource of the second reference signal. The second terminal device may determine the time domain resource of the second reference signal according to the method described in step 401 to step 403, and send the second reference signal and the third physical channel to the network device. The third physical channel may be a physical channel scheduled by the second physical layer signaling, and is a physical channel corresponding to the second reference signal. The receiving module 1620 may receive the second reference signal and the third physical channel that are sent by the second terminal device, where the second reference signal and the first reference signal may be located on the same time domain resource, and located on different frequency domain resources or code domain resources, and the first physical channel and the third physical channel are located in different TTIs. Then, the demodulation module 1630 may demodulate the third physical channel according to the second reference signal.

Optionally, the first physical layer signaling is first DCI, the second physical layer signaling is second DCI, and the first DCI or the second DCI or both are unicast signaling, or the first DCI and the second DCI are same DCI and are multicast signaling.

In this embodiment of the present invention, the network device sends the first physical layer signaling to the first terminal device, where the first physical layer signaling includes configuration information used to indicate the time domain resource of the first reference signal; and then the first terminal device may determine the time domain resource of the first reference signal and/or a time domain resource of the first physical channel according to the configuration information. Therefore, the network device can dynamically configure the time domain resource of the reference signal, so as to improve flexibility of reference signal configuration. For example, to reduce reference signal overheads, and increase a system capacity, the network device may configure, particularly when a length of the TTI is less than 1 ms, that one reference signal is used for demodulation of a plurality of physical channels.

For example, when channel estimation performance is poor, and reference signal overheads need to be increased, the network device may configure, in one timeslot, that a reference signal occupies a time domain resource of at least two symbols.

Based on a same technical conception, an embodiment of the present invention further provides a reference signal transmission system. The system provided in this embodiment may implement the procedures in the embodiments shown in FIG. 4, FIG. 12, and FIG. 14 of the present disclosure. The system includes a terminal device and a network device, the terminal device is the terminal device in the embodiments shown in FIG. 2 and FIG. 15, and the network device is the network device in the embodiments shown in FIG. 3 and FIG. 16.

The terminal device is configured to: receive physical layer signaling sent by the network device, where the physical layer signaling includes configuration information, and the configuration information is used to indicate a time domain resource of a reference signal; determine the time domain resource of the reference signal according to the configuration information; and send the reference signal and a first physical channel to the network device, where the reference signal is used for demodulation of the first physical channel.

The network device is configured to: send the physical layer signaling to the terminal device, where the physical layer signaling includes the configuration information, and the configuration information is used to indicate the time domain resource of the reference signal; receive the reference signal and the first physical channel that are sent by the terminal device; and demodulate the first physical channel according to the reference signal.

The physical layer signaling may be DCI.

During implementation, the network device may determine the time domain resource of the reference signal, and send the physical layer signaling to the terminal device (which may be any terminal device, that is, the terminal device described in the procedure shown in FIG. 4), where the physical layer signaling includes the configuration information, and the configuration information is used to indicate the time domain resource of the reference signal, that is, the physical layer signaling includes information used to indicate the time domain resource of the reference signal. For specific content of the physical layer signaling, refer to the description of the physical layer signaling in step 401 to step 403. Details are not described herein again. After the network device sends the physical layer signaling to the terminal device, the terminal device may receive the physical layer signaling sent by the network device, where the physical layer signaling includes the configuration information, and the configuration information is used to indicate a time domain resource of a reference signal corresponding to a physical channel scheduled by the physical layer signaling. After receiving the physical layer signaling sent by the network device, the terminal device may determine the time domain resource of the reference signal according to the configuration information included in the physical layer signaling. Specifically, N predefined reference signal time domain configurations of the reference signal may be pre-stored in the terminal device; and after receiving the physical layer signaling sent by the network device, the terminal device may determine the time domain resource of the reference signal according to a configuration manner indicated by the configuration information included in the physical layer signaling. After determining the time domain resource of the reference signal, the terminal device may send the reference signal and the physical channel to the network device, where the reference signal is used for demodulation of the physical channel, that is, the reference signal is the reference signal corresponding to the physical channel scheduled by the physical layer signaling. After the terminal device sends the reference signal and the physical channel to the network device, the network device may receive the reference signal and the physical channel that are sent by the terminal device. After receiving the reference signal and the physical channel that are sent by the terminal device, the network device may demodulate the physical channel according to the reference signal corresponding to the physical channel.

A person of ordinary skill in the art may understand that all or some of the steps of the embodiments may be implemented by hardware or a program instructing related hardware.

The program may be stored in a computer-readable storage medium. The storage medium may be read-only memory, a magnetic disk, an optical disc, or the like.

The foregoing descriptions are merely embodiments of the present invention, but are not intended to limit the present invention. Any modification, equivalent replacement, improvement and the like made without departing from the spirit and principle of the present disclosure shall fall within the protection scope of the present disclosure.

What is claimed is:

1. A reference signal transmission method, wherein the method comprises:
    receiving, by a terminal device, physical layer signaling, wherein the physical layer signaling comprises downlink control information (DCI) that comprises configuration information of $\lceil \log_2 N \rceil$ bits that corresponds to N different configurations of a time domain resource of a reference signal, wherein N is an integer greater than 1 and $\lceil \ \rceil$ represents a ceiling function;
    wherein the N different configurations comprise a first configuration indicating that the reference signal is located on a first symbol or a last symbol in a transmission time interval (TTI) and a first physical channel occupies all symbols in the TTI except the first symbol or last symbol occupied by the reference signal;
    wherein the N different configurations comprise a second configuration indicating that the reference signal is located in a TTI prior to a TTI with all symbols occupied by the first physical channel;
    determining, by the terminal device, the time domain resource of the reference signal according to the configuration information; and
    sending, by the terminal device, the reference signal and the first physical channel, wherein the reference signal is used for demodulation of the first physical channel.

2. The method according to claim 1, wherein the reference signal and the first physical channel are located in a same timeslot, and the configuration information indicates that the reference signal is located on an $a^{th}$ symbol in the timeslot, wherein a is a positive integer that is not greater than 7.

3. The method according to claim 1, wherein the method further comprises:
    sending, by the terminal device, a second physical channel, wherein the reference signal is used for demodulation of the second physical channel, and the first physical channel and the second physical channel are located in different TTIs.

4. The method according to claim 1, wherein the method further comprises:
    determining, by the terminal device, the time domain resource of the first physical channel according to the configuration information.

5. A reference signal transmission method, wherein the method comprises:
    sending, by a network device, physical layer signaling, wherein the physical layer signaling comprises downlink control information (DCI) that comprises configuration information of $\lceil \log_2 N \rceil$ bits that corresponds to N different configurations of a time domain resource of a reference signal, wherein N is an integer greater than 1 and $\lceil \ \rceil$ represents a ceiling function;
    wherein the N different configurations comprise a first configuration indicating that the reference signal is located on a first symbol or a last symbol in a transmission time interval (TTI) and a first physical channel occupies all symbols in the TTI except the first symbol or last symbol occupied by the reference signal;
    wherein the N different configurations comprise a second configuration indicating that the reference signal is located in a TTI prior to a TTI with all symbols occupied by the first physical channel;
    receiving, by the network device, the reference signal and the first physical channel; and
    demodulating, by the network device, the first physical channel according to the reference signal.

6. The method according to claim 5, wherein the reference signal and the first physical channel are located in a same timeslot, and the configuration information indicates that the reference signal is located on an $a^{th}$ symbol in the timeslot, wherein a is a positive integer that is not greater than 7.

7. The method according to claim 5, wherein the method further comprises:
    receiving, by the network device, a second physical channel, wherein the first physical channel and the second physical channel are located in different TTIs; and
    demodulating, by the network device, the second physical channel according to the reference signal.

8. A terminal device, comprising:
    at least one processor; and
    a non-transitory computer-readable storage medium coupled to the at least one processor and storing programming instructions for execution by the at least one processor, the programming instructions instruct the at least one processor to perform operations comprising:
        receiving, by a terminal device, physical layer signaling, wherein the physical layer signaling comprises downlink control information (DCI) that comprises configuration information of $\lceil \log_2 N \rceil$ bits that corresponds to N different configurations of a time domain resource of a reference signal, wherein N is an integer greater than 1 and $\lceil \ \rceil$ represents a ceiling function;
        wherein the N different configurations comprise a first configuration indicating that the reference signal is located on a first symbol or a last symbol in a transmission time interval (TTI) and a first physical channel occupies all symbols in the TTI except the first symbol or last symbol occupied by the reference signal;
        wherein the N different configurations comprise a second configuration indicating that the reference signal is located in a TTI prior to a TTI with all symbols occupied by the first physical channel;
        determining, by the terminal device, the time domain resource of the reference signal according to the configuration information; and sending, by the terminal device, the reference signal and the first physical channel, wherein the reference signal is used for demodulation of the first physical channel.

9. The terminal device according to claim 8, wherein the reference signal and the first physical channel are located in a same timeslot, and the configuration information indicates that the reference signal is located on an $a^{th}$ symbol in the timeslot, wherein a is a positive integer that is not greater than 7.

10. The terminal device according to claim 8, wherein the operations further comprise:
sending a second physical channel, wherein the reference signal is used for demodulation of the second physical channel, and the first physical channel and the second physical channel are located in different TTIs.

11. The terminal device according to claim 8, wherein the operations further comprise:
determining, by the terminal device, the time domain resource of the first physical channel according to the configuration information.

* * * * *